United States Patent [19]

Kageyama et al.

[11] Patent Number: 5,058,037

[45] Date of Patent: Oct. 15, 1991

[54] METHOD AND APPARATUS FOR CONTROLLING PRINTER

[75] Inventors: Seiji Kageyama, Fuchuu; Keiichi Nakane, Yokohama; Hiroaki Kambayashi, Sagamihara, all of Japan

[73] Assignee: Hitachi, Ltd., Tokyo, Japan

[21] Appl. No.: 650,013

[22] Filed: Feb. 4, 1991

Related U.S. Application Data

[63] Continuation of Ser. No. 373,262, Jun. 27, 1989, Pat. No. 4,992,958.

[30] Foreign Application Priority Data

Jun. 27, 1988 [JP] Japan .................................. 63-158481

[51] Int. Cl.⁵ .............................................. G06K 15/00
[52] U.S. Cl. .................................... 364/519; 364/235; 364/930
[58] Field of Search ............................... 364/518–520, 364/235 MS, 430 MS; 346/154, 1.1; 358/296; 400/65, 61

[56] References Cited

U.S. PATENT DOCUMENTS

| | | | |
|---|---|---|---|
| 4,516,139 | 5/1985 | Takiguchi | 358/296 |
| 4,682,190 | 7/1987 | Ikeda | 346/154 |
| 4,992,958 | 2/1991 | Kageyama et al. | 364/519 |

Primary Examiner—Arthur G. Evans
Attorney, Agent, or Firm—Antonelli, Terry, Stout & Kraus

[57] ABSTRACT

In a printer controller which receives a command series containing a drawing command for instructing a drawing operation, and also a printing command for instructing a printing operation, the command series being transmitted from a host computer, there are employed a central processing unit and a memory unit, and a command buffer unit for storing the command series and a page buffer unit for storing plural pages of drawn dot image data are formed in the memory unit. The central process unit executes both a task process program for executing the drawing command and printing command as a drawing task and a printing task respectively, and a task control program for performing a task control for processing the respective tasks in this task process program. Further, a task control table for holding task control information is provided in the memory unit. The task control program performs a task control in accordance with a content of the task control table.

34 Claims, 23 Drawing Sheets

READY QUEUE

EVENT WAITING QUEUE

TASK CONTROL BLOCK (TCB)

PAGE BUFFER CONTROL TABLE

FIG. 7B

TASK INFORMATION 721

| DRAW·PRINT STATE | 721-a |
| DRAW TASK NO. USING THE PRESENT PAGE |
| PRINT TASK NO. USING THE PRESENT PAGE |
| ROOT POINTER OF THE QUEUE FOR WAITING THE VACANCY OF THE PRESENT PAGE |

FIG. 7D

INFORMATION ABOUT FEEDING AND OUTPUTTING SHEET 723

| SHEET FEEDING MEANS |
| SHEET OUTPUTTING MEANS |
| ONE SIDE/BOTH SIDE PRINT |
| FRONT SIDE/BACK SIDE PRINT |
| PRINT PAGE SEQUENCE NO. |
| TOTAL PRINT NUMBER |
| PRESENT PRINT NUMBER |

FIG. 7C

COORDINATE INFORMATION ABOUT PAPER SIZE 722

| PAGE HEAD ADDRESS |
| WIDTH OF PAPER SIZE |
| HEIGHT OF PAPER SIZE |
| MEMORY CAPACITY OF THE PAGE |
| PRINT ORIENTATION (PORTRAIT/LANDSCAPE) |

FIG. 7E

DRAW·PRINT STATE 721-a

| STATE | CONTENTS |
|---|---|
| DRAW FEASIBLE | VACANCY (AFTER FINISHING PRINT, PRIOR TO DRAW) |
| ON DRAWING | AFTER START DRAWING, PRIOS TO, PRINT PROCESS |
| PRINT FEASIBLE | AFTER STARTING PRINT PROCESS, PRIOR TO ISSUING COMMAND PRINT START |
| PRINT START | AFTER PRINT START, PRIOR TO READING OUT FROM PAGE BUFFER |
| ON PRINTING NO. 1 | ON READING OUT FROM PAGE BUFFER (NON-ZERO CLEAR MODE) |
| ON PRINTING NO. 2 | ON READING OUT FROM PAGE BUFFER (ZERO CLEAR MODE) |

PRINTER CONTROL TABLE

TAKE INFORMATION 82

PRINTER STATE 81

METHOD AND APPARATUS FOR CONTROLLING PRINTER

This application is a Continuation of U.S. application Ser. No. 373,262, filed June 27, 1989 now U.S. Pat. No. 4,992,958.

BACKGROUND OF THE INVENTION

The present invention relates to a method for controlling a page printer such as a laser beam printer, and also to a controlling apparatus for a page printer.

Very recently, in the field of information processing apparatuses (referred to as an "IHS" hereinafter) such as a personal computer (referred to as a "PC" hereinafter) and a work station (referred to as a "WS" hereinafter), page printers are commonly used, which are typically referred as an optical printer, e.g., a laser beam printer (referred to as an "LBP" hereinafter), a light emitting diode printer (referred to as an "LEDP" hereinafter), and a liquid crystal shutter printer (referred to as a "LCSP" hereinafter). In general, a printer is designed to be connected via a printer control unit to a host computer such as PC and WS.

As described in, for instance, Japanese KOKAI (Disclosure) Patent Application No. 62-1735263, the conventional printer controlling apparatus is arranged as represented in FIG. 2. In this figure, a command series transmitted by a host computer (not shown) is drawn as a dot pattern into a first page region 231 within a page buffer 23 by way of a central processing apparatus (referred to as a "CPU" hereinafter). When the drawing of the character fonts, graphics, or image on the page buffer has been accomplished by means of 1-page command series, the data stored within the first page region are read by a printer adaptor 24, processed in a parallel-serial conversion, and thereafter output as a video signal to a printer engine unit 25. In the printer engine unit 25, the printing process is performed so as to print one page of a paper sheet.

In accordance with the above-described conventional printer controlling apparatus, a plurality of page regions 231, 232 and 233 are prepared for the page buffer 23. Also both drawing character fonts, graphics or images on the page buffer and printing operation are executed in a parallel mode by performing the data transfer (reading) from another page region to the printer engine 25 while drawing (writing) character fonts, graphics or images on one page region in order to increase the throughput.

However, in the prior art printer controlling apparatus, no care is taken to the controlling method for executing both the writing operation to the page buffer by way of drawing the character fonts, graphics, or images, and the reading operation from the page buffer by way of printing the data without any idle time. Even if the high-speed printer engine or page buffer constructed of a plurality of pages is employed, there is a problem that the printing operation is performed only at the lower speed than the engine speed since idle times are present in the various operating stages.

SUMMARY OF THE INVENTION

An object of the present invention is to provide a printer controlling method and a printer controlling apparatus capable of extracting the high-speed printing performance of the printer engine unit.

Another object of the present invention is to provide a printer controlling method and a printer controlling apparatus capable of operating both the printer engine unit and page buffer unit without any idle time.

A still further object of the present invention is to provide a printer controlling apparatus employing a central processing unit (CPU) such as a microcomputer so as to perform the high-speed printing operation by the printer engine unit.

To achieve the above-described object, a printer controlling apparatus according to the present invention comprises: a command buffer unit for storing a command series which contains a drawing command for instructing a received drawing operation and also a printing command for instructing a printing operation; a task processing unit for performing as a drawing task and a printing task both a drawing command and a printing command; and a task control unit for performing a task control so as to process each of the tasks, said task control unit controlling the processes of the drawing task and printing task under execution in response to a drawing condition as well as a printing condition.

Preferably, a task supervising (control) table unit for holding information about task control is employed, and a task control unit performs a task control in accordance with a content of the task supervising table unit. Also, the page buffer unit includes a plurality of pages. Furthermore, both a page buffer supervising table for holding page buffer supervising information and a printer supervising table unit for holding printer supervising information are employed, and the task processing unit performs the task process in accordance with contents of the page buffer supervising table unit and printer supervising table unit. The command buffer unit receives the command series under an asynchronism condition.

At least, the process of the task control unit is executed by CPU of the printer control processing apparatus. At least, both a completion of readout operation to the page buffer unit and a completion of use of the printer can be announced by way of the interruption to CPU.

In addition, according to the present invention, both a page buffer control unit and printer control unit are additionally employed. Preferably, based upon the contents of the page buffer supervising table unit and printer supervising table, both the page buffer and printer engine are supervised. As a result, a work can be performed independently from the process of the task processing unit, so that sorts of printers can be readily changed.

Upon execution of the drawing task in the task processing unit, a first of all, a judgement is made on a feasible condition for drawing. In case of an infeasible condition for drawing (for instance, the page buffer is not empty), sleeping a task is immediately initialized (activated), and the task scheduler is initialized after the condition of the present task is changed from the execution condition to the waiting condition. The task scheduler selects and initializes the task to be executed in the next stage.

Also when the printing task is executed, a judgement is made on the feasible condition for printing. In case of the infeasible condition for printing (there is no page in which the drawing is completed in the page buffer, the printer engine is brought into the extraordinary condition, or the printing command is not accepted), sleeping a task and task scheduler are initialized immediately, similar to the case of the drawing task.

Once the task is brought into the waiting condition, at the time when an event for waking up the waiting task may occur, this task is immediately brought into the executable condition by way of the interrupting process. The drawing task is waken up by an event (interrupt) corresponding to the end of reading out from page buffer by the adaptor unit. The printing task is waken up by an event corresponding to making next print feasible (a next printing command can be accepted). Just thereafter, the task scheduler is energized so that the task having the highest priority is selected among the tasks which are able to be executed, and initialized.

While has been described above, a selection is made in the task under execution condition in response to the feasible condition for drawing and feasible condition for printing such as empty conditions of the page within the page buffer unit and printer engine unit. Accordingly, since both the printer engine unit and page buffer unit constructed of a plurality of pages can be utilized without any idle time, the throughput of the printer controlling operation can be improved.

BRIEF DESCRIPTION OF THE DRAWINGS

FIGS. 7A to 7E are diagrams for representing a concrete preferred embodiment of the page buffer control table unit in the second preferred embodiment shown in FIG. 6;

DETAILED DESCRIPTION OF THE PREFERRED EMBODIMENTS

Figure 1:
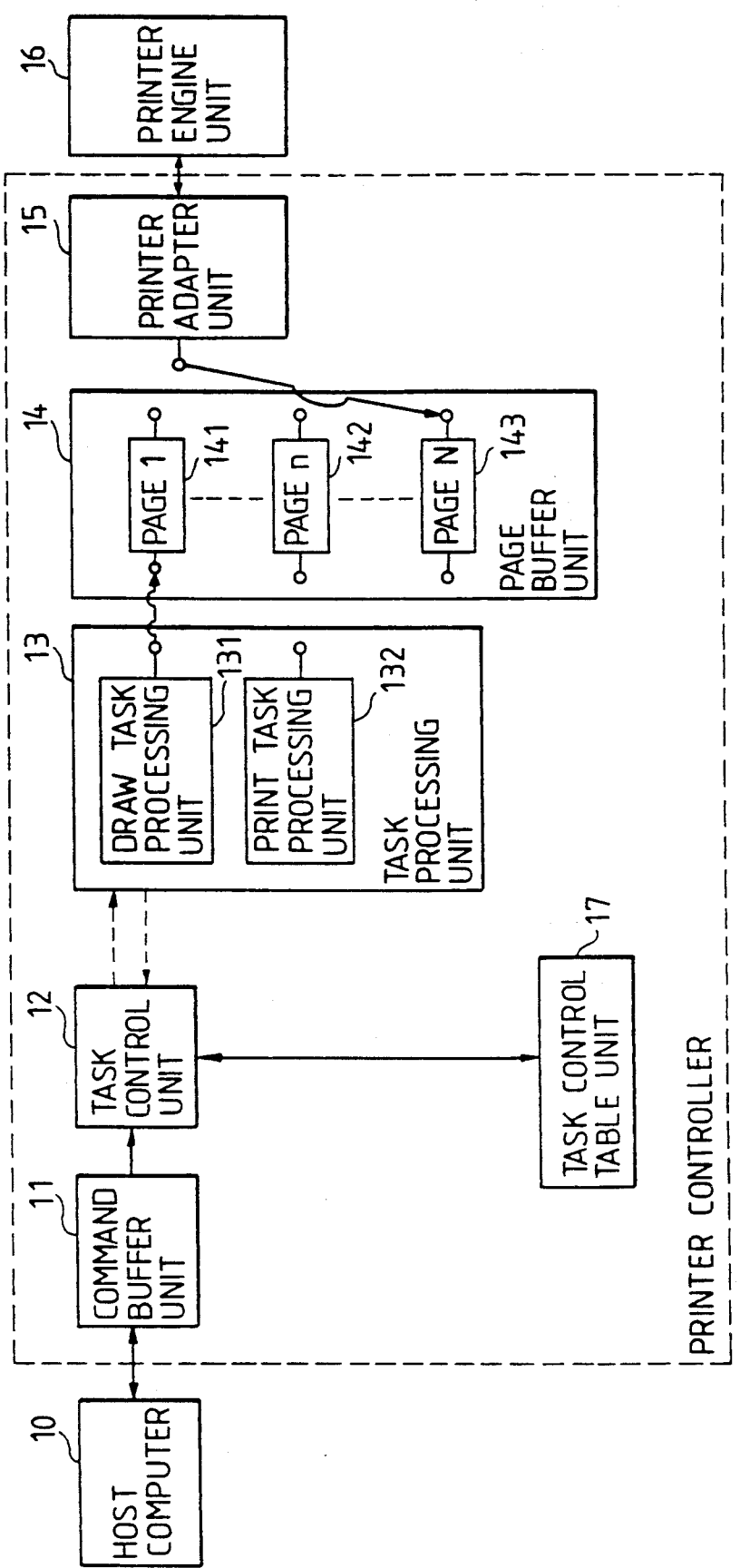
FIG. 1 is a schematic block diagram for representing a functional arrangement of a first preferred embodiment of the present invention.
Figure 2:
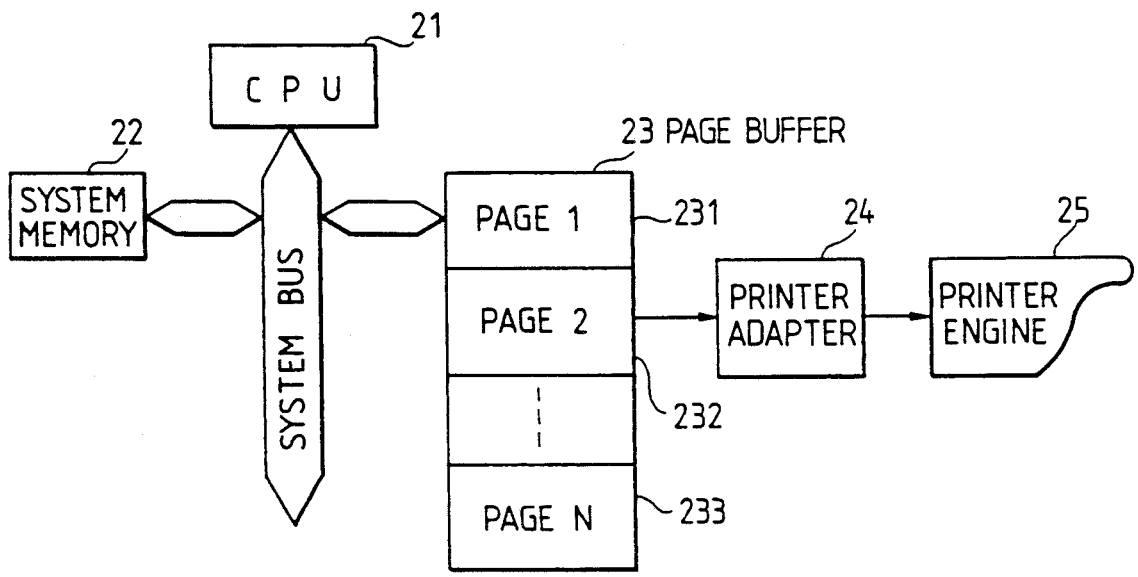
FIG. 2 is a schematic block diagram for indicating a brief arrangement of the conventional printer controlling apparatus.

Referring now to FIG. 1, a printer controlling apparatus according to a preferred embodiment of the present invention will be described.

In FIG. 1, the printer controlling apparatus is constructed of a command buffer unit 11, a task control unit 12, a task processing unit 13, a page buffer unit 14, a printer adapter unit 15, and a queue for task control unit (task control table unit) 17, in view of functions.

A series of commands such as a draw command for instructing the drawing operation, and a print command for instructing the printing operation which have been transferred from a host computer 10 is stored into the command buffer unit 11. It should be noted that each of pages is defined as 0 or more than 1 draw command series and also one printing command, and transferred by the host computer. The commands which have been stored in the command buffer unit 11 are processed by the task processing unit 13.

The task control unit 12 are constituted by various functions such as task create, task execute, task wait, task wake up, task end, and task scheduler. Among these functions, in the task create process, the tasks are processed in accordance with the respective commands stored in the command buffer unit 11, and are connected to a ready (waiting) queue within the queues for task control unit 17. The draw task and print task for constituting each page are produced one by one. The respective tasks connected thereto are successively selected by the task execution process, and initialized. It should be noted that the timings of the task create and task execute are controlled by the task scheduler. A detailed content thereof will be discussed later. The processes of the initialized respective tasks are executed in a draw task processing unit 131 and a printer task processing unit 132 in the task processing unit 13.

In the draw task unit 131, a first judgement is made on the feasible condition for drawing. As the feasible condition, it is used an empty condition of each page within the page buffer unit 14. If the drawing operation is feasible (i.e., empty condition), a draw command series constituting the draw task is performed so as to write characters, graphics, images or the like on an empty page (e.g., page 142) in a dot image form. Conversely if the drawing operation is not feasible, i.e., infeasible, (i.e., no empty condition), a task waiting process in the task control unit 12 is fetched to bring the drawing task in question into a page buffer empty waiting condition. After this task waiting condition is moved to the drawing condition waiting queue within the task control table unit 17, the task scheduler is initialized.

In the printer task processing unit 132, a judgement is made to the printing feasible condition. The printing feasible condition is determined based upon the conditions of the page buffer unit 14 and printer engine unit 16, and it is required that there is a page in which the drawing of characters, graphics, and images on a page buffer has been accomplished within the page buffer 14, and also the printing command can be accepted under the condition that the printer engine unit 16 is not brought into the abnormal condition. If the printing operation is feasible, after an issuance of the printing instruction into the printer engine unit 16 is carried out via the printer adapter unit 15, the task waiting operation is initialized and then the printing task in question is brought into the printing end waiting condition. After the printing task is transferred to the printing condition waiting queue within the task control table unit 17, the task scheduler is initialized. If the printing operation is infeasible, the task waiting process is called up, the printing task in question is brought into the printer empty waiting condition, and the task scheduler is initialized after the printing task in question is moved to the printing condition waiting queue within the task control table unit 17.

The printer adaptor unit 15, after the printing instruction has been issued to the printer engine unit 16, outputs the dot image data stored in the page 142 functioning as a subject of the printing task in question in response to the instruction given by the print task processing unit 132 in accordance with the video signal interface between the printer engine unit 16 and the printer adaptor unit 15.

The printing instruction allow interruption process is initialized by the printer adapter unit 15 at a time instant when the printing instruction to the printer engine unit 16 is feasible. The printer adapter unit 15 also initializes the page readout end interruption process at a time instant when the readout operation for 1-page dot image data has been accomplished. Two interrupt processes initialize the task wake-up process. If either the first task (printing task) within the respective printing condition waiting queues, or the first task (drawing task) within the drawing condition waiting queues is present, the task wake-up process is brought into the ready state on the respective most highest priorities and the succeeding priority, and the scheduler is initialized after the first tasks are transferred to the ready waiting queue. A detailed explanation on the task wake-up operation will be made later.

When an empty condition is established in either the printer engine unit 16, or page buffer unit 14 by performing the interruption processes in question, the printing task or drawing task which are being waited is immediately initialized. A central processing unit ("CPU" will be discussed later) executes either the printing task, or drawing task without any idle time by way of the scheduler. Since CPU, printer engine unit 16 and page buffer unit (constructed of a plurality of pages) can be used without any idle time by the above-described task controlling functions, the throughput can be improved and therefore the printing operation under the high speed condition of the printer engine can be realized.

As will be described later, the respective functional block unit shown in FIG. 1 is constructed of employing a microprocessor, RAM, ROM, LSI and logic IC and so on.

Then, contents of the task control unit 12 as a feature of the present invention will now be described.

Figure 3:
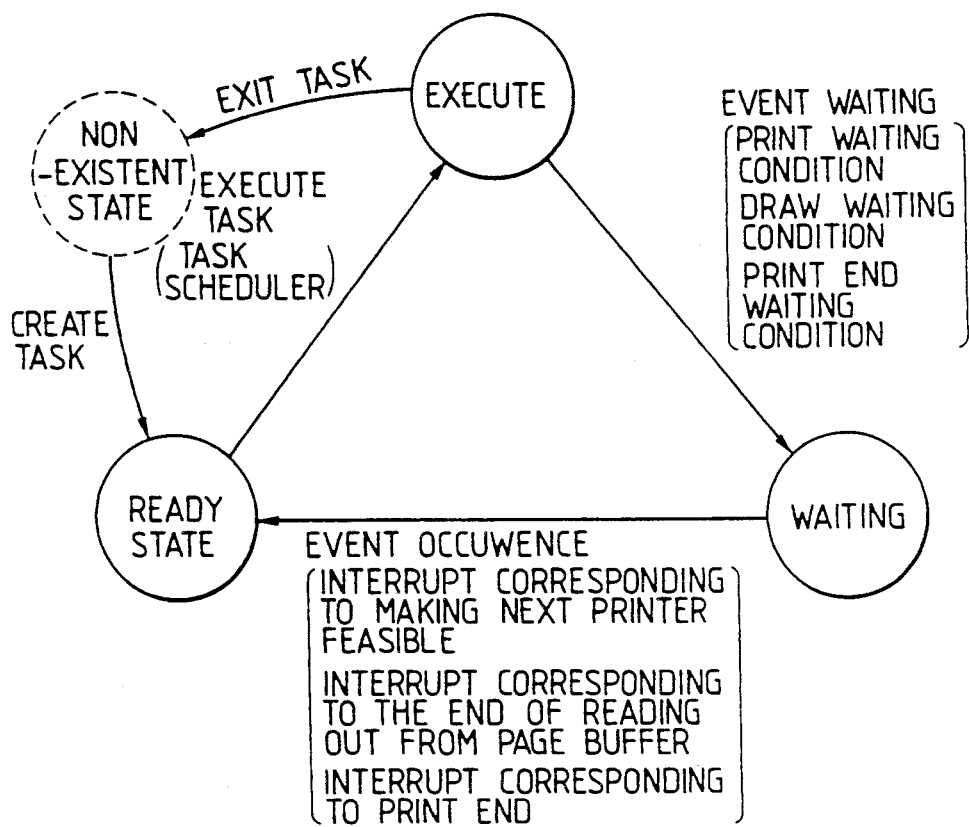
FIG. 3 is a transition diagram of operations of the task controlling unit in the first preferred embodiment shown in FIG. 1.

First of all, the task condition and state transition in-between will now be described with reference to FIG. 3. As shown in FIG. 3, the task takes one of the following four conditions.

(i). Non-existent: The condition where the task is not yet registered into the system.

(ii). Run Execute: The condition where the task is under execution in CPU.

(iii). Ready: The condition where the task is registered in the system, and CPU is waited for allocation.

(iv). Wait: The condition where the task under run condition issues the task waiting process (supervisor call, simply referred to as "SVC") since the drawing condition and printing condition are not yet prepared, and waits for preparations of these conditions.

In accordance with the preferred embodiment of the invention, as the waiting issue factors, three factors are employed: 1) printing condition waiting: 2) drawing condition waiting, and 3) printing end waiting. These three waiting conditions 1), 2), and 3) are returned to the ready state when the printing instruction allow interrupt, page readout end interrupt end interrupt are issued respectively. The third waiting condition 3) is used in case that the end of the printing task by outputting sheets is waited after the process of the printing task is moved from CPU to the printer adapter unit 15 and printer engine unit 16. The printing end interrupt is produced at a time instant when the sheets are normally output from the printer engine unit. The printing task which is reoperated in conjunction with the interrupt process in question will initialize a task end process (will be described later) after the remaining process (the printed page serial number is updated and a report to a host computer) is performed.

Then, each of the task control functions, namely a) task create, b) task execute, c) task wait, d) task wake up, e) task end, and f) task scheduler are successively described.

a). Task create
  (i). Until a total amount of tasks within the ready waiting queue is equal to an allowable maximum value, or the command buffer unit 11 becomes empty, the command is taken out from the command buffer unit 11, and added to the ready waiting queue as the task. The priority of the task to be added is selected to be 2.
  (ii). Subsequently, the task scheduler is initialized to execute the task having the higher priority.

(b). Task execution
  (i). If there exists the task under execution (having the priority "P"), a task having the highest priority within the present queue, which is higher than the previous priority "P", is searched from the ready waiting queue. If there is the task having such a highest priority, after the task under execution is transferred to the ready waiting queue, the searched task is brought into the execution condition. If not, the present task execution process is accomplished.
  (ii). If there exists no task under execution, a task having the highest priority in the ready waiting queue is searched and thus brought into the execution condition.
  (iii). If the ready waiting queue is empty in case of (ii), the present task execution process is completed.

(c). Task wait
  (i). Each of the tasks is transferred from the execution condition to the wait condition, and moved to each of the event waiting queue at a time instant when various waiting conditions such as 1) the printing waiting condition; 2) the draw waiting condition; and 3) printing end waiting condition will occur.
  (ii). After the task under execution condition has been moved to the event waiting queue, the task scheduler is initialized and the task having the highest priority is performed.

(d). Task wake up
  (i). At a time instant when various interrupt events such as making next print feasible, the end of reading out from page buffer, and printing end may occur, the task is waken up to be transferred from the waiting condition to the ready state. More specifically, after the priority of the task is changed, the first task of the respective event waiting queues is removed from the queue, and thereafter added to the ready waiting queue. As a result of change in the priority, the printing task is set to the maximum priority (for instance, priority "0"), and the drawing task is set to the succeeding priority (for instance, priority 1).

(ii). Subsequently, the task scheduler is initialized so as to reschedule the task.

As a consequence, due to the priority changing control denoted by (i), both the drawing command and printing command received from the host computer 10 can be correctly printed in the order of the received pages.

(e). Task end

The task is ended in the following procedure.

(i). The task under execution, precisely speaking task control block (simply referred to as "TCB") is deleted.

(ii). The task scheduler is initialized.

(f). Task scheduler (i). Initialization timing

When the following events are produced, the task scheduler is initialized. A selection is made on the task having the higher priority and the initialization is performed.

1). Task create
2). Task end
3). Task wait
4). Task wake up
5). Other executions of task control functions required for the initialization of the task scheduler.

(ii). Processing contents

The task execution is initialized. Upon execution of the task, if the ready waiting queue is empty and there is no next task to be executed, the task execution is reinitialized after the task create is initialized.

In FIG. 4, there is shown one example of the task control table unit 17 for controlling the process of the task control unit 12.

Figure 4A:
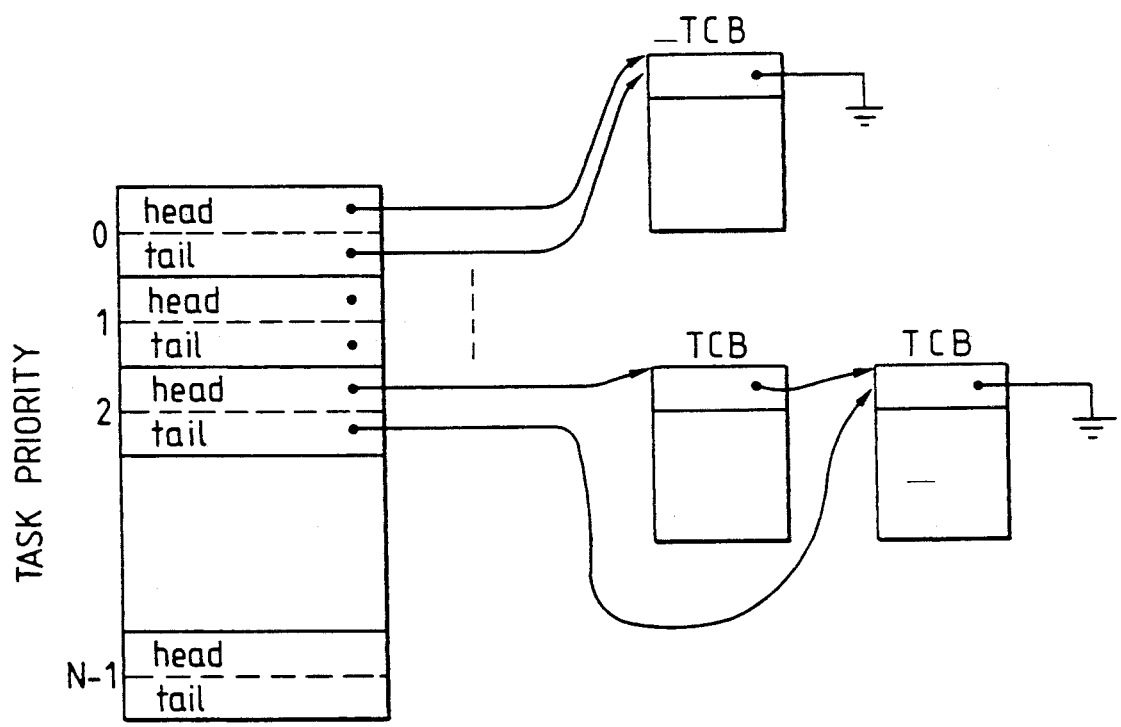
FIGS. 4A to 4C are diagrams for representing a concrete preferred embodiment of the task control table unit in the first preferred embodiment of FIG. 1.
Figure 4B:
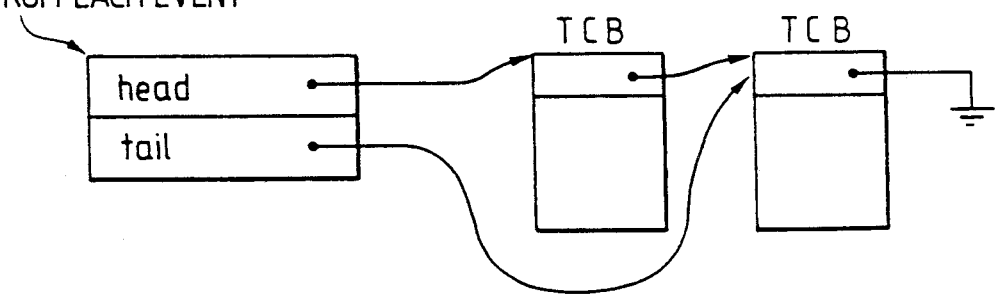
Figure 4C:
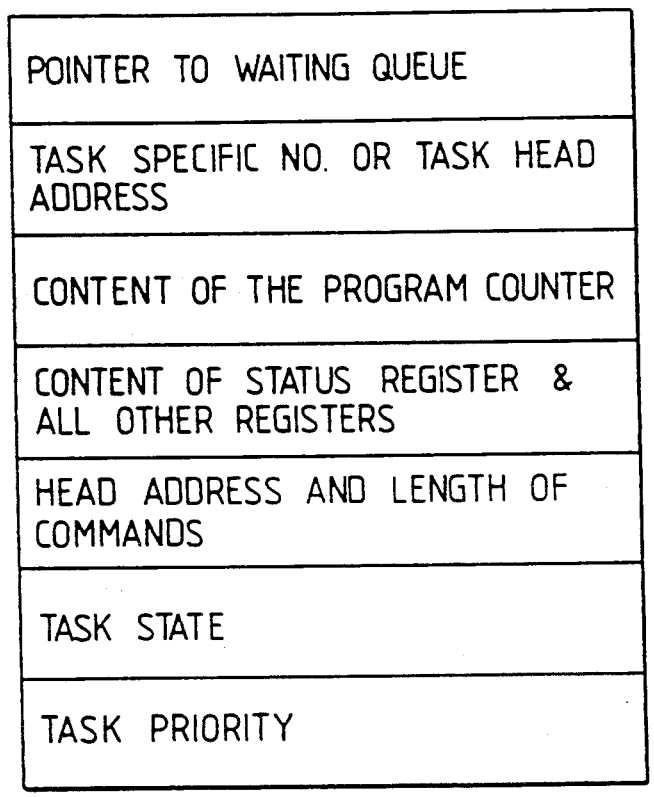
Figure 5A:
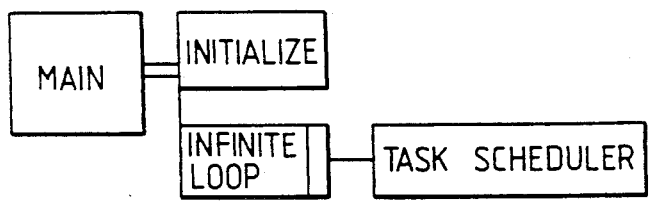
FIGS. 5A to 5J are problem analysis diagrams for explaining various operations of the first preferred embodiment of FIG. 1.
Figure 5B:
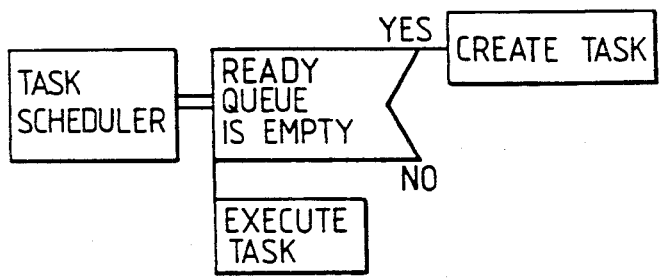
Figure 5C:
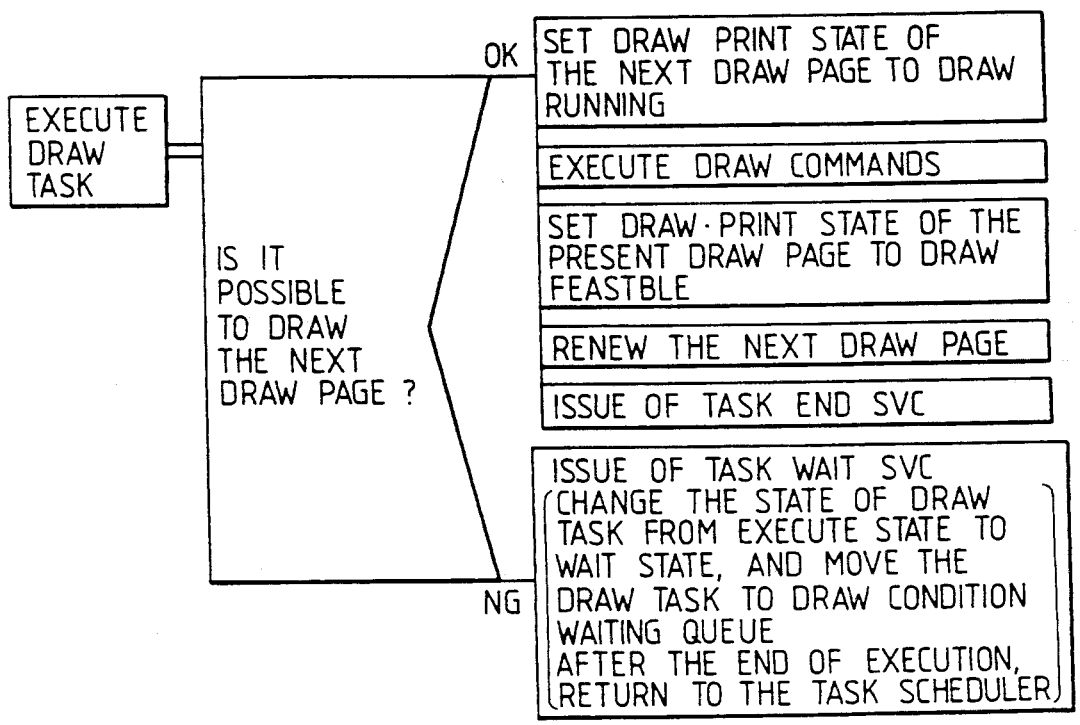
Figure 5D:
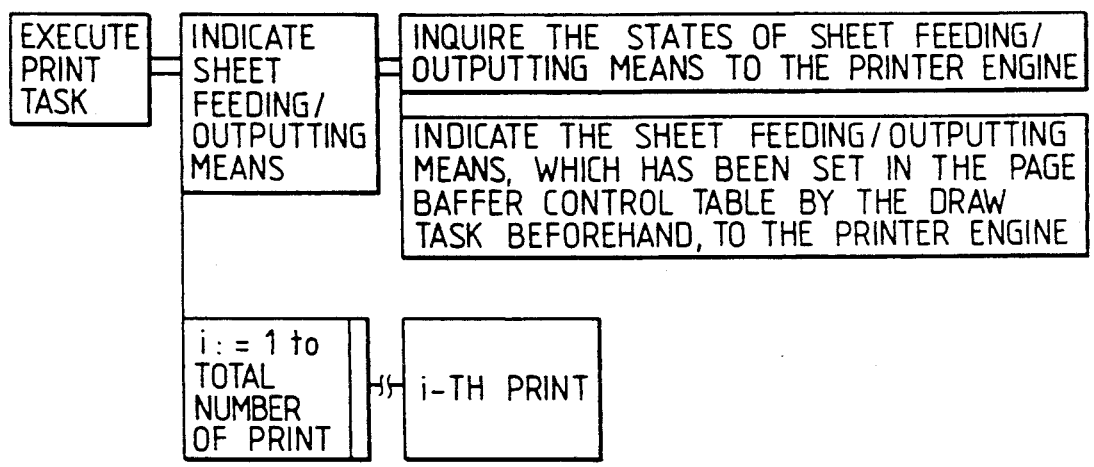
Figure 5E:
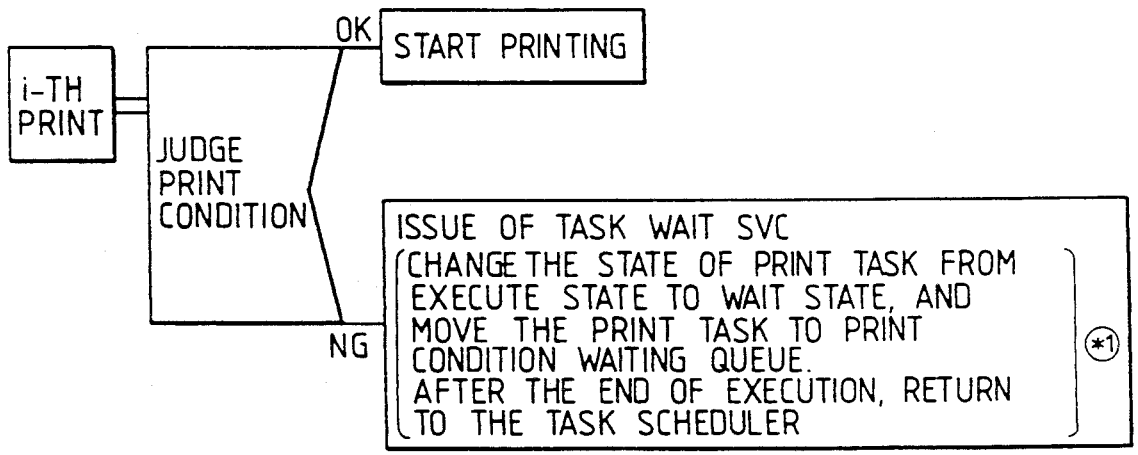
Figure 5F:
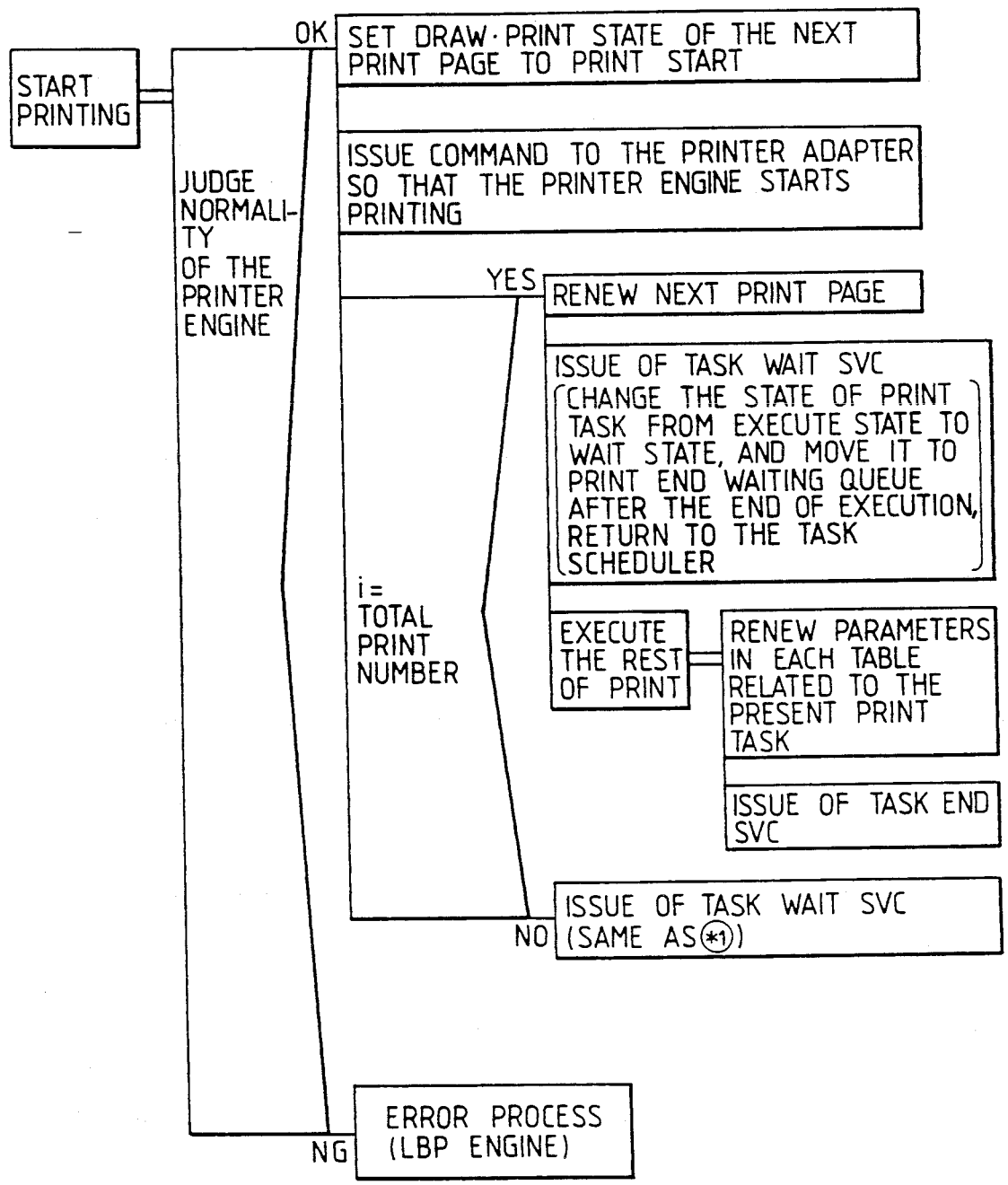
Figure 5G:
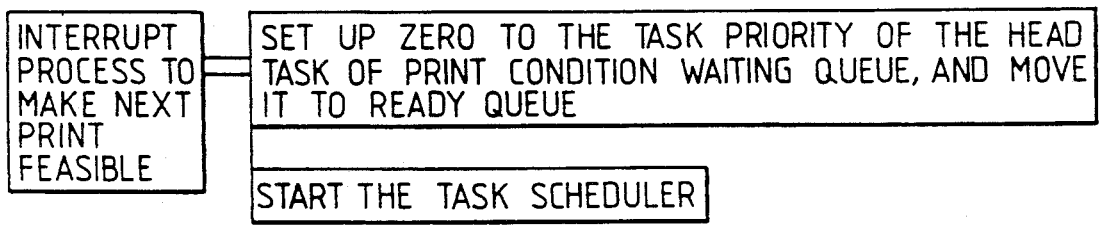
Figure 5H:
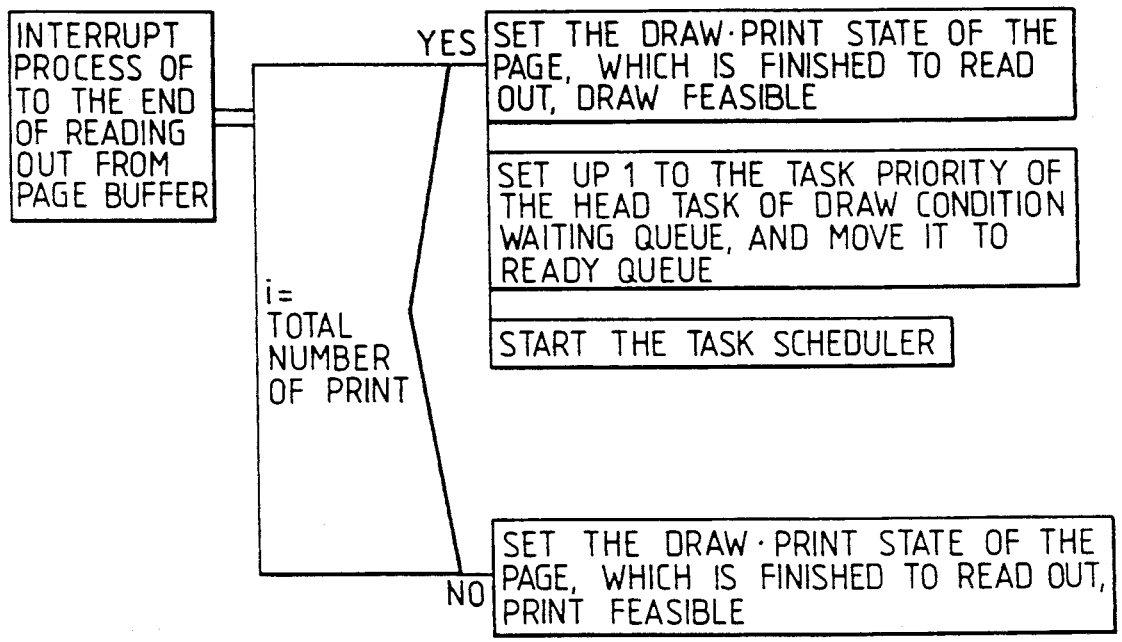
Figure 5I:
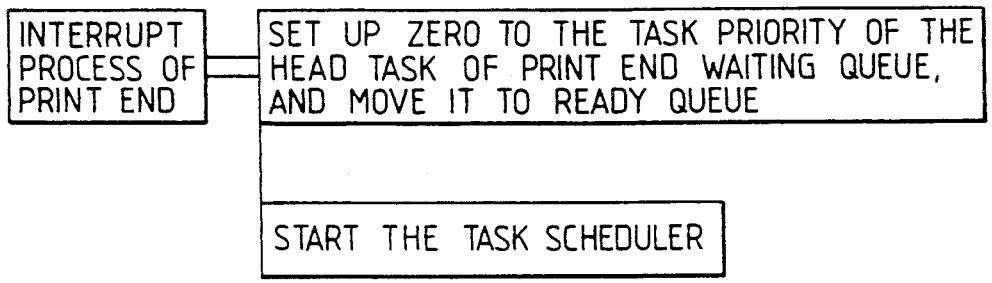
Figure 5J:
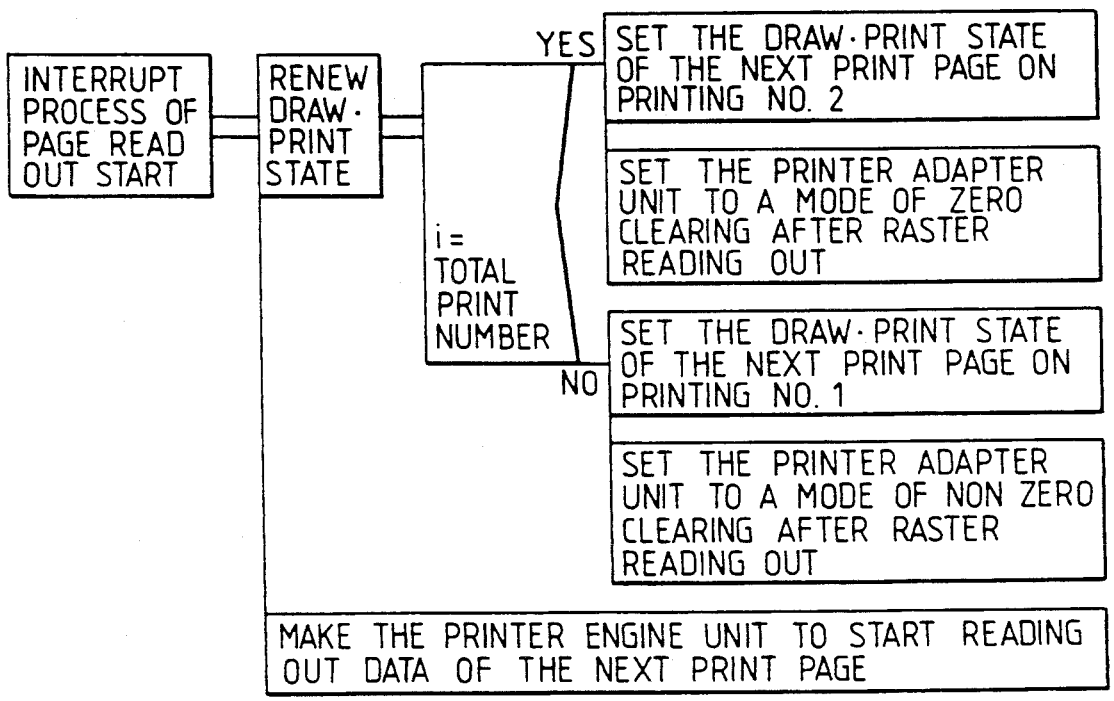

In the task control table unit 17, there are provided two queues, i.e., the ready waiting queue shown in FIG. 4A and event waiting queue shown in FIG. 4B. The former corresponds to a table for controlling the execution of the task under the ready condition by CPU. The latter corresponds to a table for describing and controlling the tasks under the waiting conditions, such as 1) printing condition waiting, 2) drawing condition waiting, and 3) printing end waiting. Also, in FIG. 4C, there is shown a content of TCB (Task Control Block) functioning as a construction element of the ready condition waiting queue and event waiting queue.

The above-described operation sequence according to the preferred embodiment, is shown in problem analysis diagrams of FIGS. 5A to 5J (simply referred to as a "PAD"). FIGS. 5A to 5J represent the operation sequences such as executions of main, task scheduler, and draw task, an execution of the print task, i-th part printing, print starting, printing instruction allow interrupting process, page readout end interrupting process, printing end interrupting process and page readout starting interrupting process.

The above-described preferred embodiment may be also applied to the following cases.

1). A total number of pages in the page buffer unit 14 is 1.

2). A total number of pages in the page buffer unit 14 TPN, and constructions or the like are dynamically changed by the command series which have been transmitted by the host computer 10. For instance, this case, corresponds to such a case that a change in the dot density of the optical printer and also a paper size is instructed by the command series.

3) As the task in the task process unit 13, a reception task from the host computer 10 and an input task from a user operation panel are added other than the drawing task and printing task.

4). As a transmission method of a command series from the host computer 10 to the apparatus in question, the following various methods are employed.

(a). Each of the drawing commands and printing commands is transmitted one by one for each page.

(b). As to the respective pages, one or more than 1 drawing command series and also one printing command are sent.

(c). In addition to the previous (a) and (b), the control information of each page (paper size, discrimination on vertical writing or horizontal writing, printing quantity, one-sided printing, another discrimination on one-sided printing and two-sided printing), is sent as a different sort of command other than the drawing commands and printing commands, or one of the drawing commands.

(5). The task is defined corresponding to the respective commands which the host computer transmits, or to the entire command series constituting 1 page. Also, as an interface between the host computer 10 and the apparatus in question, RS 232C, Centronics, SCSI, GP, IB (general-purpose interface bus) and the like are utilized According to the first preferred embodiment, by the task control functions such as the task waiting and task waking up, the page buffer unit can be operated without any idle time, so that the throughput can be improved. There is particular advantage that printing operation at the maximum speed of the printer engine can be formed.

A second preferred embodiment according to the present invention will now be explained with reference to FIG. 6. In this figure, a page buffer control table unit 18 and a printer control table unit 19 are additionally equipped with the arrangement of the printer controller shown in FIG. 1. In the page buffer control table unit 18 as to the writing operation by the drawing task to the page buffer unit 14 constructed of a plurality of pages and the readout operation by the printing task, the page buffer unit is used without any idle time. Furthermore, the accessing sequence by the respective tasks to the page buffer unit has no error. In accordance with the printer control table unit 19, the operating conditions of the printer (printer adapter unit 15 and printer engine unit 16) by the printing task are supervised so that the printer is operated without any idle time.

Figure 7A:
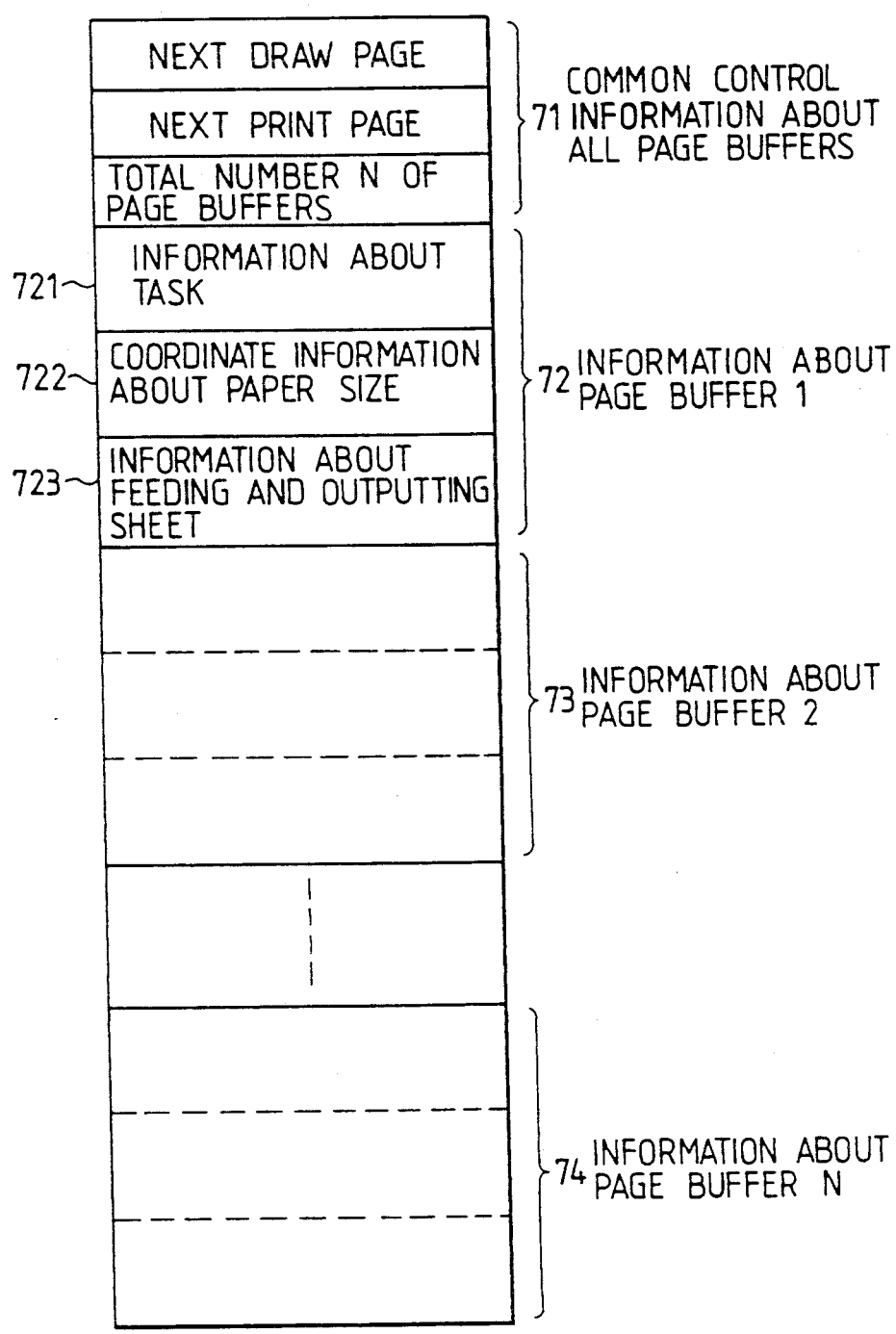

In FIG. 7, there is shown an example of the page buffer control table unit 18. FIG. 7A represents an overall arrangement of the page buffer control table unit 18. Based on common control information about all page buffers 71, a page buffer No. to be written by the drawing task and a page buffer No. to be written by the printing task are written.

For each of the pages, information about task 721, coordinate information about paper size 722, and information about feeding and outputting sheet 723 are prepared Contents of the information 721 to 723 are represented in FIGS. 7B to 7D respectively. In the information about task 721, a draw-print state 721-a for each page is included. This draw-print state 721-a is written as one of draw feasible (vacancy), on drawing, print feasible (validate), print start, on printing No. 1, and on printing No. 2 as illustrated in FIG. 7E. Further, among the information about task 721, there are the drawing task number and printing task number using the present pages, as illustrated in FIG. 7B. Moreover, the drawing task waiting for vacancy of this page is written in the information about the task 721 and used as the above-described drawing condition waiting queue.

To the coordinate information about paper size 722 shown in FIG. 7C, and the information about feeding and outputting sheet 723 shown in FIG. 7D, the draw task writes the coordinate information about paper size designated by one portion of the drawing command series and the information about feeding and outputting sheet, and also the printing task performs the printing operation by utilizing these information.

Figure 8A:
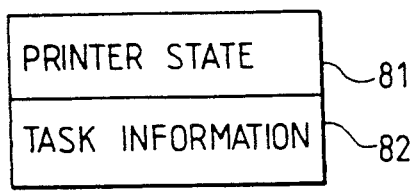
FIGS. 8A to 8C are diagrams for representing a concrete preferred embodiment of the printer control table unit in the second preferred embodiment shown in FIG. 6.
Figure 8C:
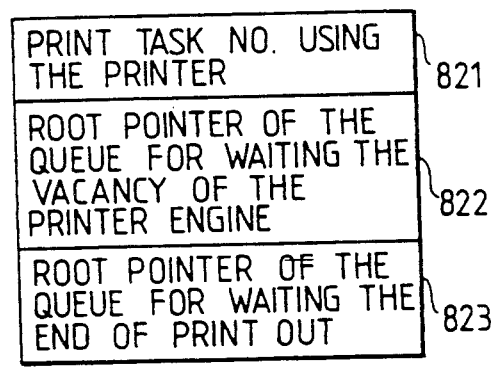
Figure 8B:
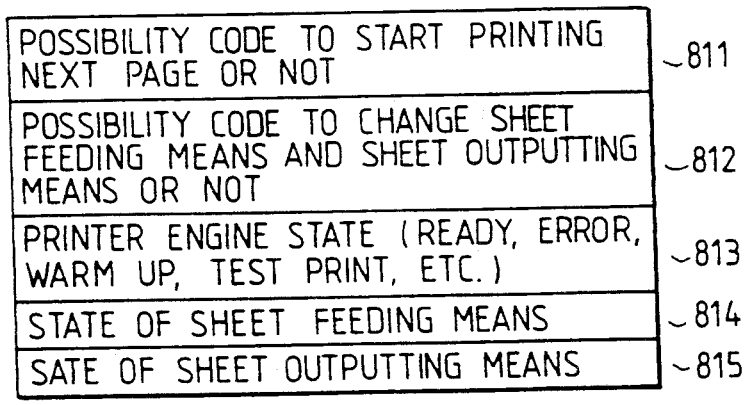

FIG. 8A represents one preferred embodiment of the printer control table unit 19. This figure indicates an example for using a laser beam printer As shown in FIG. 8B, as the printer state 81 of FIG. 8A, there are written a possibility code to start printing the next page or not 811, a possibility code to change sheet feeding means and sheet outputting means or not 812, a printer engine state (ready, error, warm up, test print, etc.) 813, a state of sheet feeding means 814, and a state of sheet outputting means 815. Also, as the information about task 82 shown in FIG. 8B, as represented in FIG. 8C, there are written a printing task for using printer 821, a printing task waiting for the vacancy of a printer engine 822, and a printing task 823 waiting for the end of print out. Among them, both the waiting tasks 822 and 823 are used as the above-described printing condition waiting queue and printing end waiting queue.

It should be noted that different sorts of page printers such as an LED printer, an LSC printer and shuttle printer other than the laser beam printer may be used if the printer control table unit is defined by the concept similar to that of the second preferred embodiment.

Figure 9:
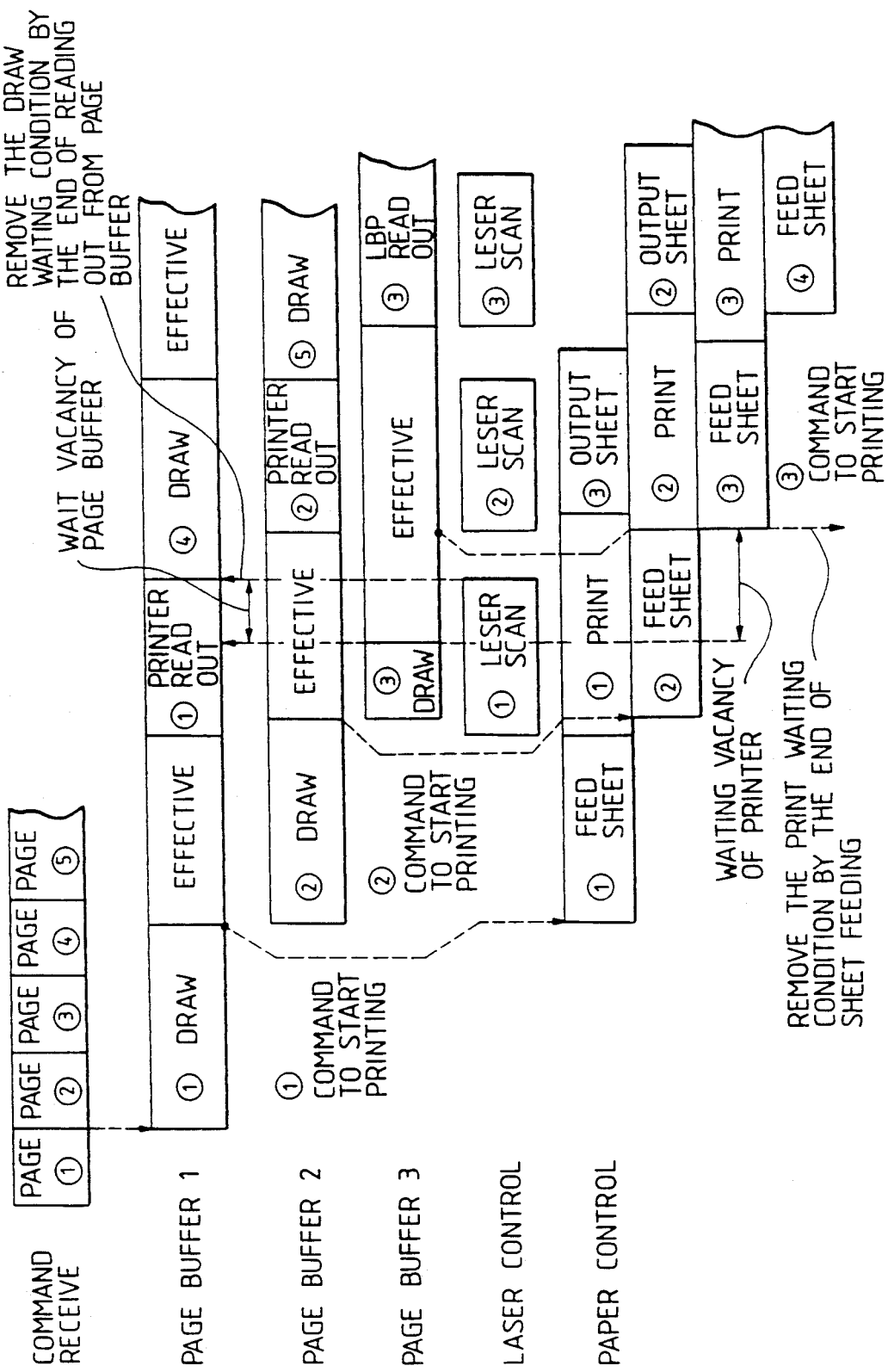
FIG. 9 is a timing chart of a parallel process for the drawing and printing operations effected in the second preferred embodiment shown in FIG. 6.

In FIG. 9, there is shown a timing chart of the pipeline (concurrent) process of the drawing and printing operations by the printer controller according to the present invention in case that the number of the page buffer is selected to be 3. As illustrated in FIG. 9, since the command reception, drawing to page buffers 1 to 3, the laser control of the printer and the paper control are performed in a pipeline mode, no empty time is produced in use of the printer and page buffer and the printer engine can be operated at the maximum speed.

In this figure, an "effective" subsequent to a "drawing" indicates such a condition that the drawing operation is completed and thus the drawing data is usable. As previously described, "command to start printing", "remove the print waiting condition by the end of sheet feeding", and "remove the draw waiting condition by the end of reading out from page buffer" are performed in response to an interrupt demand to CPU.

It should be noted that the timing of removing of the print waiting condition is varied by the characteristics of the printer engine unit 16, and may not in coincident with the timing period of the end of sheet feeding, depending upon the printer engine. However, also in this case, either the printer adapter unit 15 or printer engine unit 16 detects removing of the printing waiting condition. As a result, since the interruption on "remove the print waiting condition" is immediately issued from the printer adapter unit 15 to CPU, the present invention may be applied to the printer controller.

To perform the piepline process, the procedures employed in the preferred embodiment will now be summarized.

1). A sufficient number of the page buffer.
2). Asynchronized command reception.
3). Independent supervision of drawing task and printing task.
4). Waiting for occurrences of events on executions of the drawing task and printing task defined by 3), and supervision on the mechanism of removals thereof.

In accordance with the present invention as previously described, since page buffer control table unit 18 for controlling the page buffer unit 14 and printer control table unit 19 for controlling the printers (15, 16) are prepared, both the page buffer unit and printer can be controlled independently with respect to the control of CPU. In case that the page buffer unit and printer are changed, the program can be updated only by changing the corresponding control table unit or the access program for the table separately.

Figure 10:
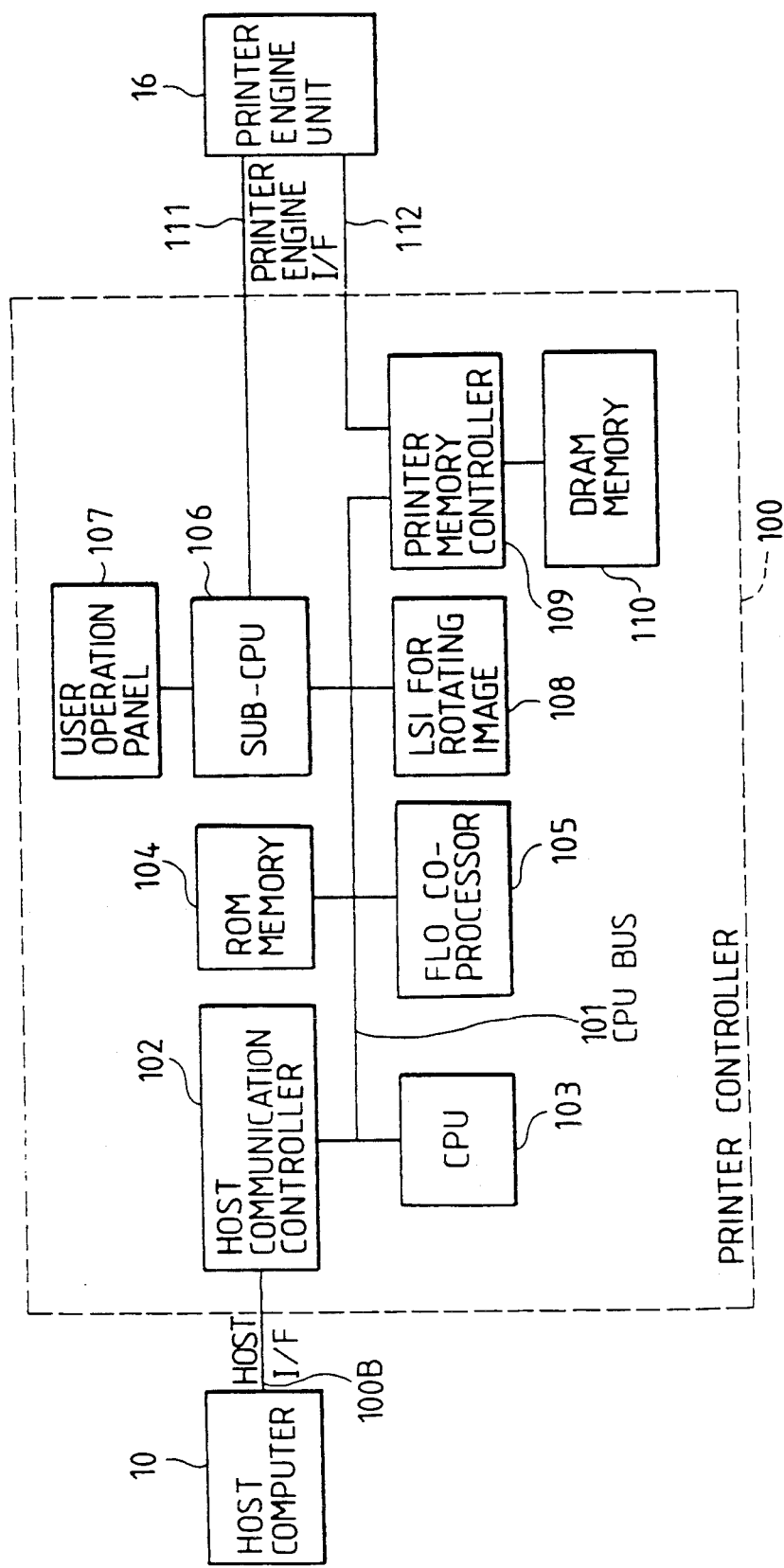
FIG. 10 is a block diagram for representing a concrete preferred embodiment for embodying the second preferred embodiment of the present invention shown in FIG. 6.

Subsequently, referring to FIG. 10, one preferred embodiment of the concrete hardware arrangement of the printer controller according to the preferred embodiment of the invention will now be described. The printer controller 100 is constructed of a CPU bus 101, a host communication controller 102, a CPU 103, a ROM memory 104, a floating decimal point co-processor 105, an LSI for rotating image 108, a printer memory controller 109, and a DRAM memory 110.

In the CPU bus 101, various input/output signals (address signal, data signal, other control signals) can be transmitted Both the floating decimal point co-processor 105 and LSI for rotating image 108 are not directly relevant to the operations of the present invention. The explanation of the host communication controller 102 was omitted in the previous preferred embodiment.

CPU 103 performs the data input/output operations via the CPU bus 101 to preferal controllers such as the host communication controller 102, a sub-CPU 106, and a printer memory controller 109, and memories such as a ROM memory 104 and a DRAM memory 110. A user operation panel 107 corresponds to an operation panel for the printer controller 100. Both the sub-CPU 106 and printer memory controller 109 have a role of the printer adapter unit 15 according to the previous preferred embodiment. The printer memory controller 109 also has a function of a memory control of the DRAM memory 110.

Figure 6:
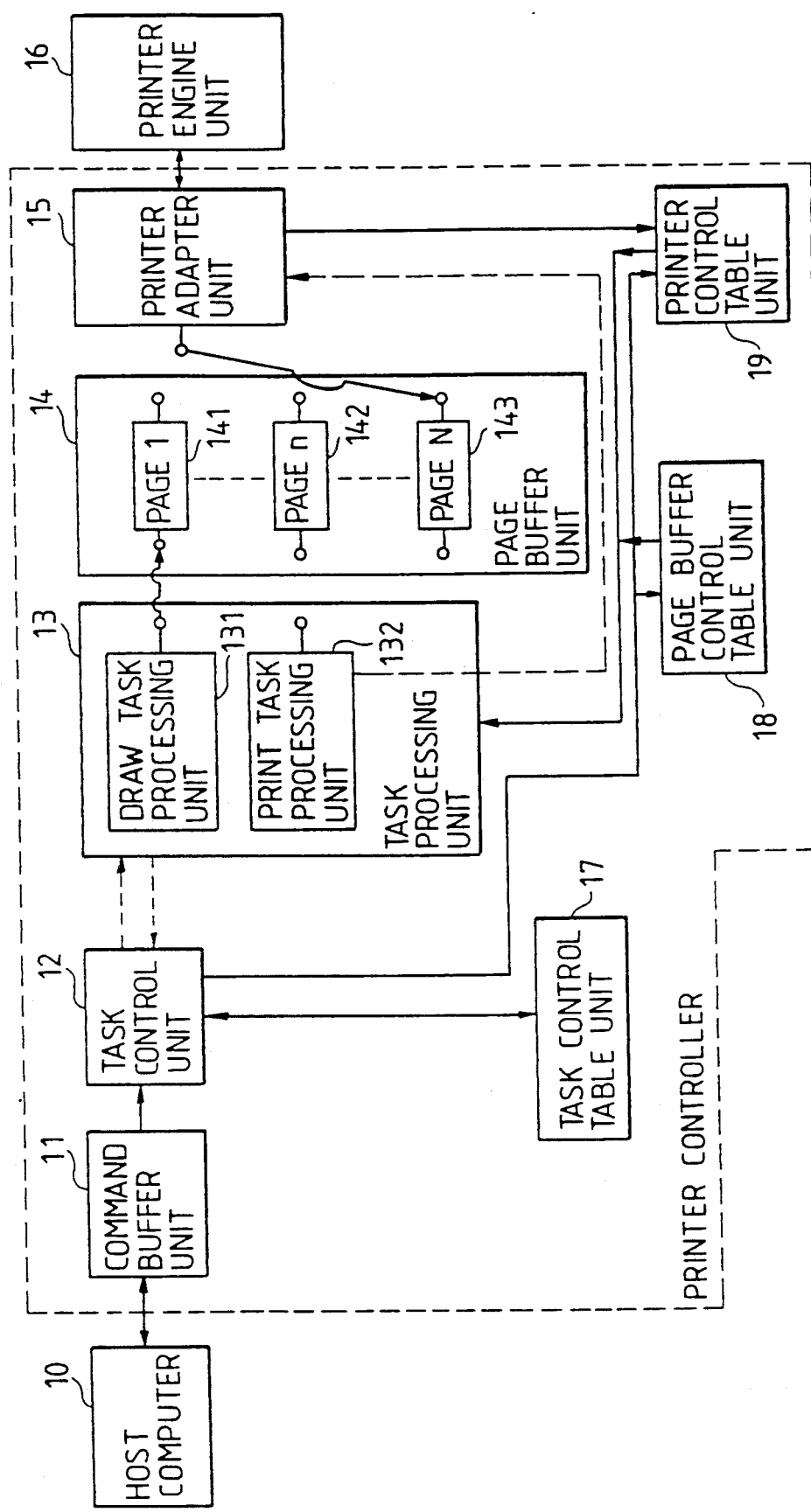
FIG. 6 is a schematic block diagram for representing a functional arrangement of a second preferred embodiment according to the present invention.

Also the previously explained task control unit 12 and task processing unit 13 in the preferred embodiment shown in FIGS. 1 and 6 are constituted by the program of CPU 103. The command buffer unit 11, page buffer unit 14, task control table unit 17, page buffer control table unit 18 and printer control table unit 19 are constructed in a predetermined region within the DRAM memory 110. The DRAM memory 110 stores the control program of the printer controller 100 and character font and the like.

The host communication controller 102 corresponds to a controller for performing communications between the printer controller and host computer 10. As a physical interface of this host interface, SCSI (small computer system Interface), RS232C, RS422, GP-IB (general purpose interface bus), Centronics, and HDLC (high-level data link control) may be selected in accordance with a sort of the used physical interface, and employed as the hardware logic of the host communication controller 102.

The ROM memory 104 stores an initial program loading program (IPL) for the printer controller 100 and a part of character font. The IPL program also has a role to store the above-described control program of the printer controller 100, and character font into the DRAM memory 110 from the host computer 10. It should be noted that these data are not stored into the DRAM memory 110, but previously stored in ROM memory 104. Conversely, no character font is stored in the ROM memory 104 and all of these data may be stored in the DRAM memory 110.

The sub-CPU 106 performs the input/output process between the user operation panel 107, printer engine unit 16. The printer memory controller 109 performs the readout process of the contents (in normal, the contents of the page buffer unit 14) of the DRAM memory 110 to the printer engine unit 16, and also control (refreshing) of the DRAM memory 110. This readout process is carried out by utilizing the Direct Memory Access (DMA) function contained in the printer memory controller 109. At a time instant when the readout operation of one page data from the page buffer unit 14 is accomplished, the printer memory controller 109 asserts an interrupt signal (a portion of a signal in the CPU bus 101) for CPU 103, and the page readout end interrupt process by CPU 103 is initialized.

In the printer controller 100, the sub-CPU 106 performs the communication via a signal line 112 between the printer engine unit 16 in accordance with an Interface (not shown) which is so-called as a "video Interface". As previously described, the signal line 112 sends an image output signal for reading the contents of the page buffer unit 14 to the printer engine unit 16. On the other hand, another signal line 111 sends an interrogating from the sub-CPU 106 to the printer engine unit 16, and a command for an instruction to the printer engine unit 16. The signal line 111 also sends and receives between the sub-CPU 106 and the printer engine unit 16, a command for receiving a response status, a status send/receive signal, and a control signal for controlling a readout sequence of the contents of the page buffer unit 14 to the printer engine unit 16.

The sub-CPU 106 detects that the printing instruction to the printer engine unit 16 becomes feasible, and the interrupt signal to CPU 103 is asserted at the detection time instant, and also the printing instruction allow interrupt process by CPU 103 is initialized.

Figure 11:
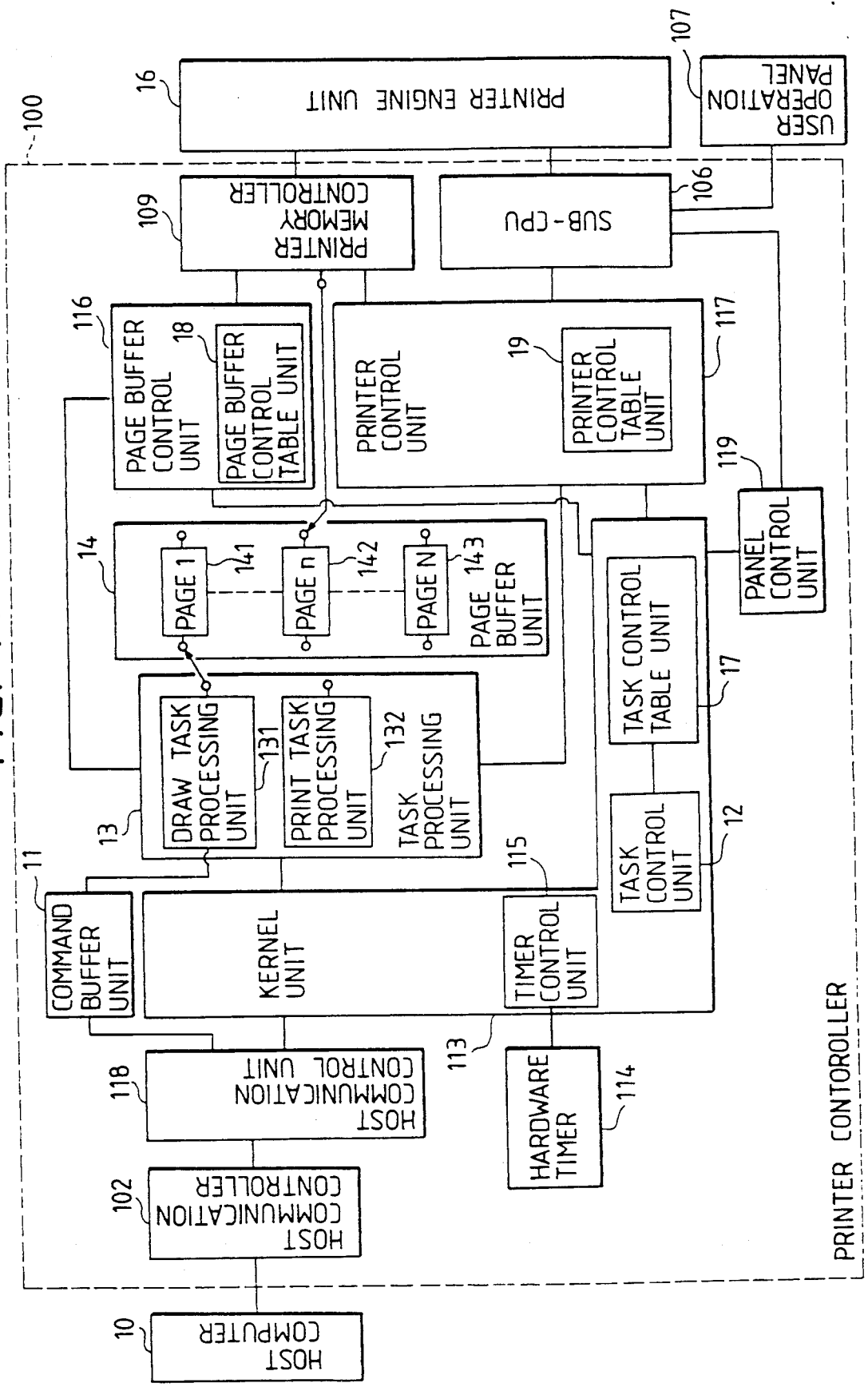
FIG. 11 is a block diagram for indicating a concrete arrangement according to a third preferred embodiment of the present invention.

Then, a third preferred embodiment according to the present invention will now be described with reference to an arrangement of FIG. 11. In the printer controller according to the third preferred embodiment, a kernel unit 113, and various device drivers, namely a page buffer control unit 116, a printer control unit 117, a host communication control unit 118 and a panel control unit 119 are newly added to the printer controller according to the second preferred embodiment.

The kernel unit 113 is arranged by a main routine for various SVC (supervisor call) processes; a main routine for various interrupt processes; a task control unit 12 and a timer control unit 115. It should be noted that the above-described various SVC processes imply service functions such as a task control, a timer control, a page buffer control, a printer control, a host communication control, and a panel control.

Upon receipt of the SVC instruction as a CPU instruction, the kernel unit analizes and discriminates its factor based upon an input parameter of SVC, and thereafter, the respective SVC processes are executed by initialize the respective SVC process routines in the respective control units 12, 115, 116, 117, 118 and 119. Also, the above-described interrupt processes correspond to a timer interrupt from a timer hardware 114; a controlling interrupt of the page buffer from the printer memory controller; a printer controlling interrupt from the printer memory controller and sub-CPU; a controlling interrupt of the host communication from the host communication controller 102; and, a controlling interrupt of the panel from the sub-CPU 106. After the kernel unit analizes and discriminates the factors of the interrupt processes, this unit executes the respective interrupt processes by initializing the separate interrupt process routines within the respective control units 115, 116, 117, 118 and 119.

Figure 12A:
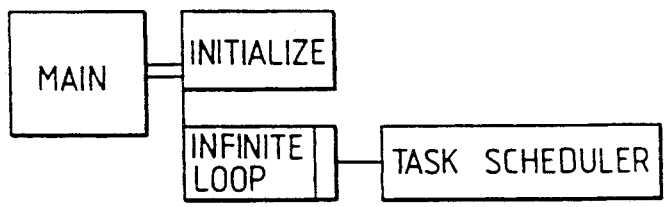
FIGS. 12A to 12J are problem analysis diagrams for explaining various operations of the third preferred embodiment shown in FIG. 11; and, FIGS. 13A to 13D are problem analysis diagrams for representing processing procedures of the functions for managing resources of the third preferred embodiment shown in FIG. 11.
Figure 12B:
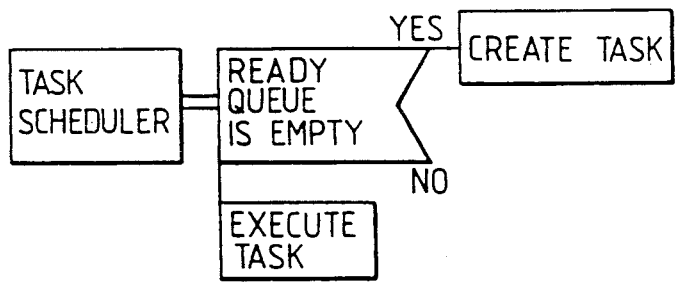
Figure 12C:
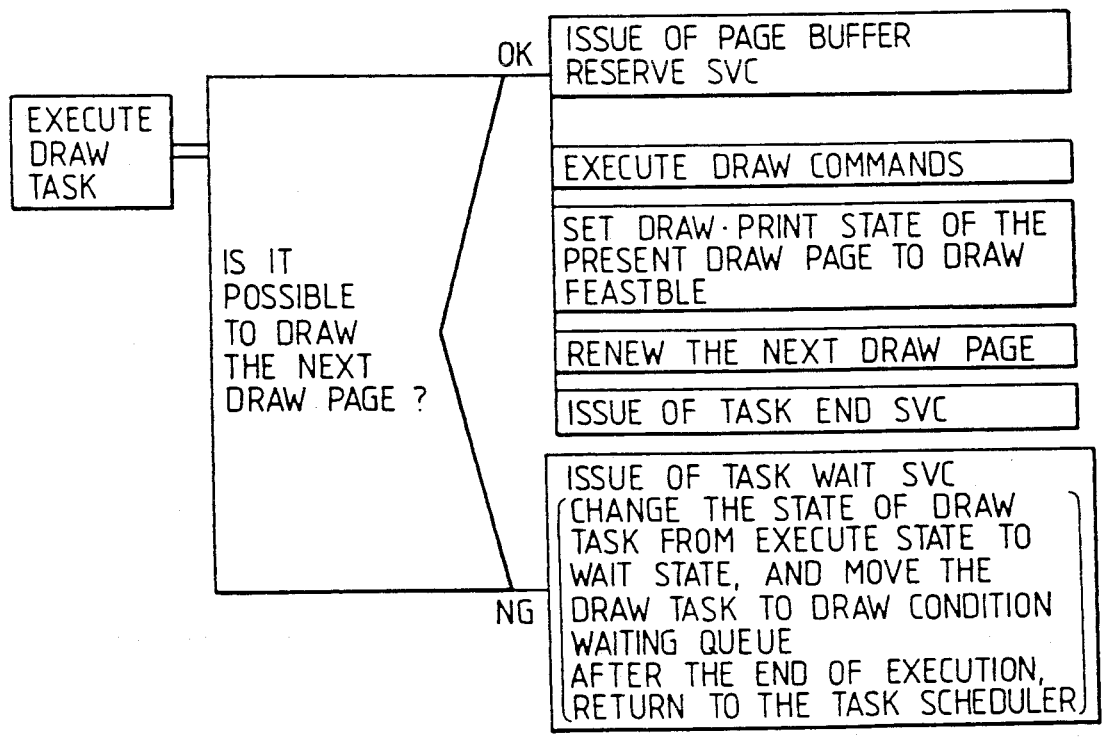
Figure 12D:
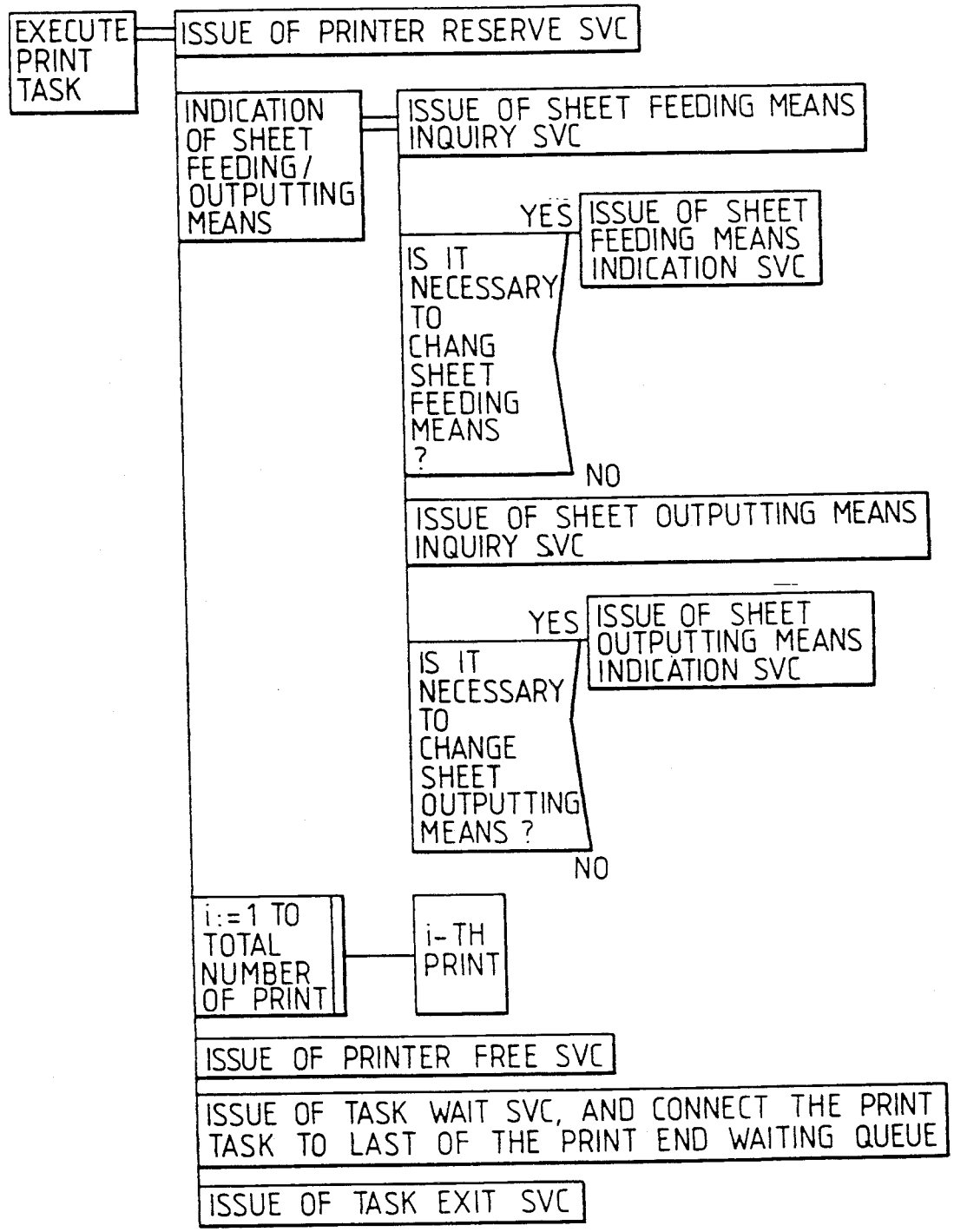
Figure 12E:
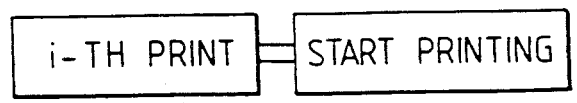
Figure 12F:
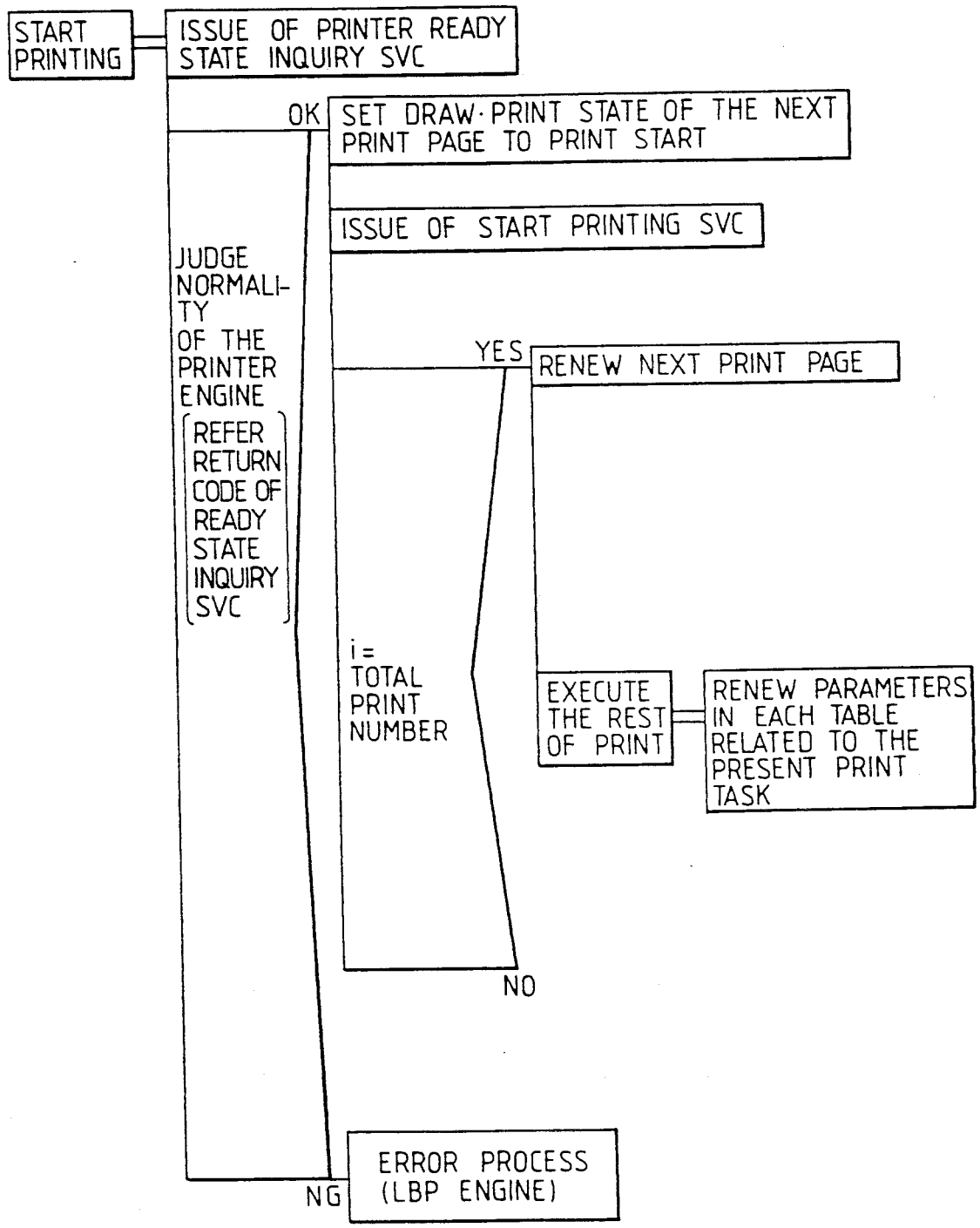
Figure 12G:
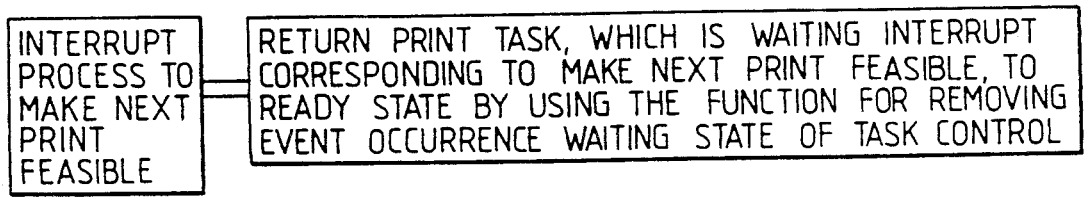
Figure 12H:
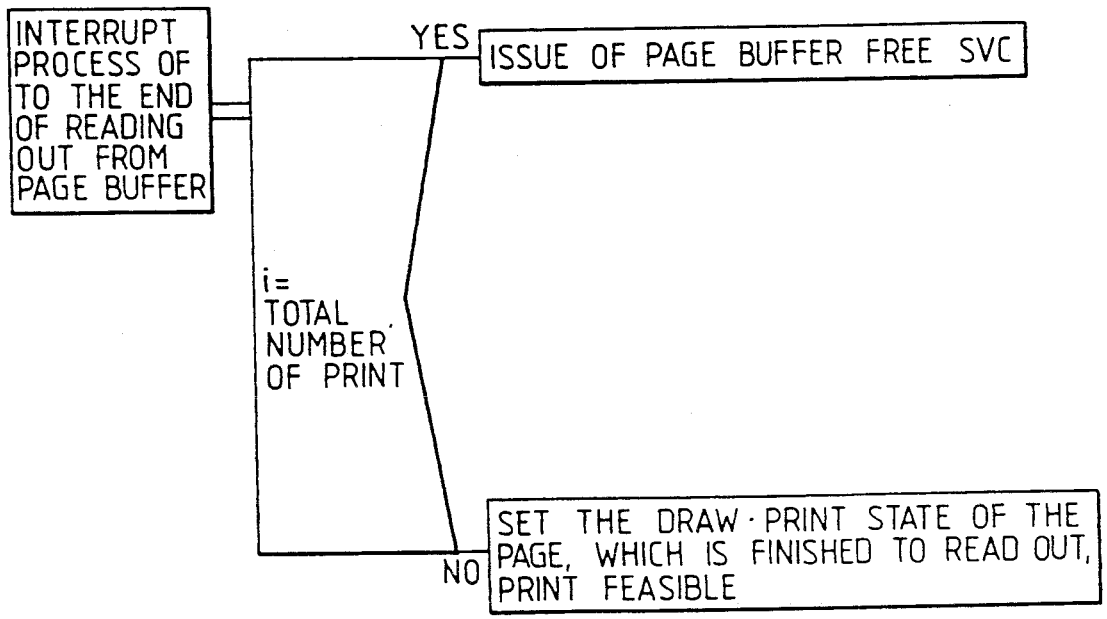
Figure 12I:
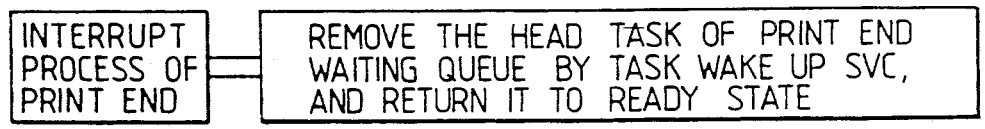
Figure 12J:
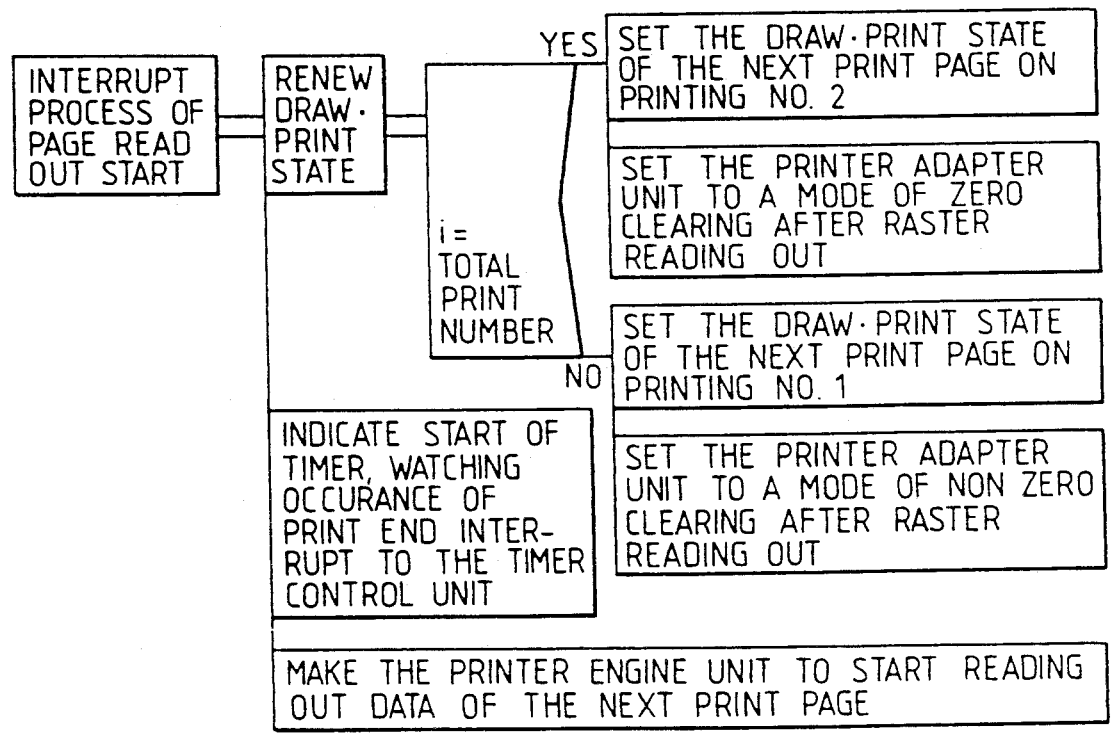
Figure 13A:
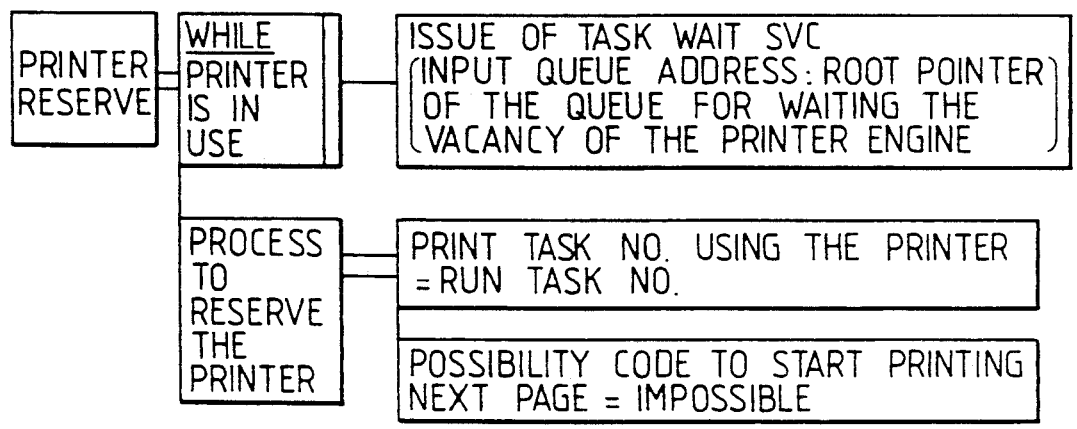
Figure 13B:
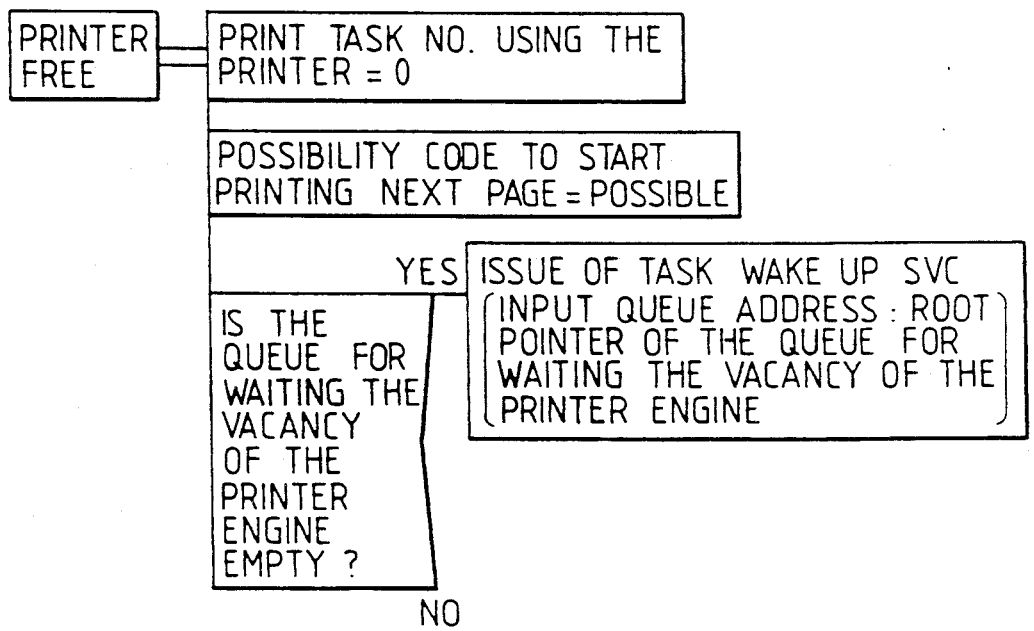
Figure 13C:
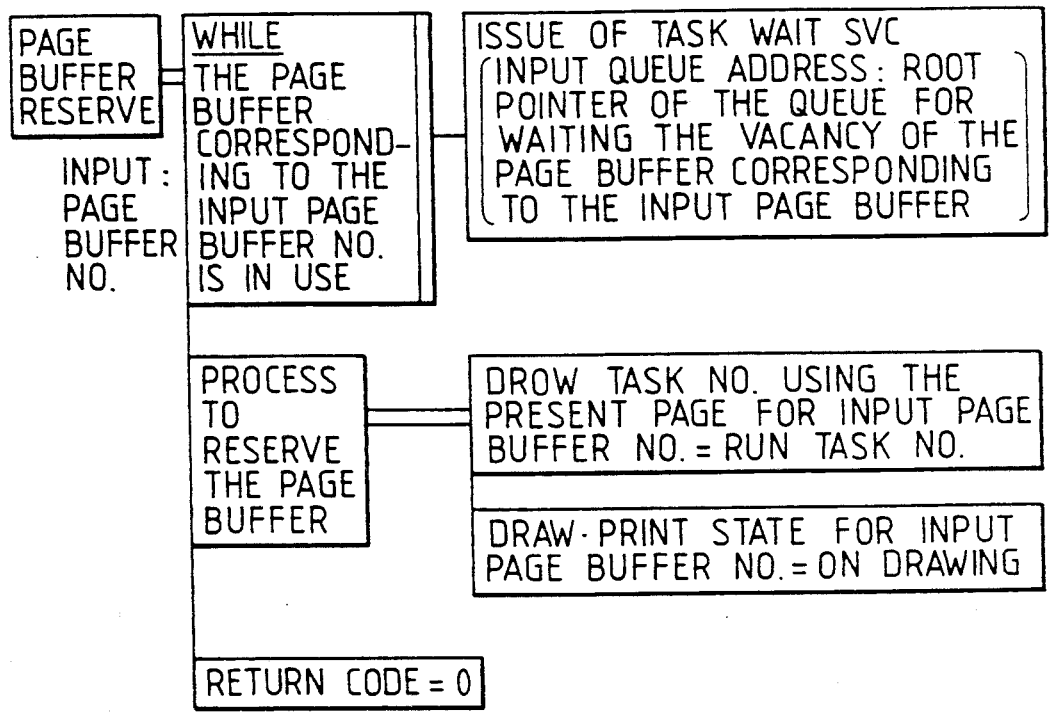
Figure 13D:
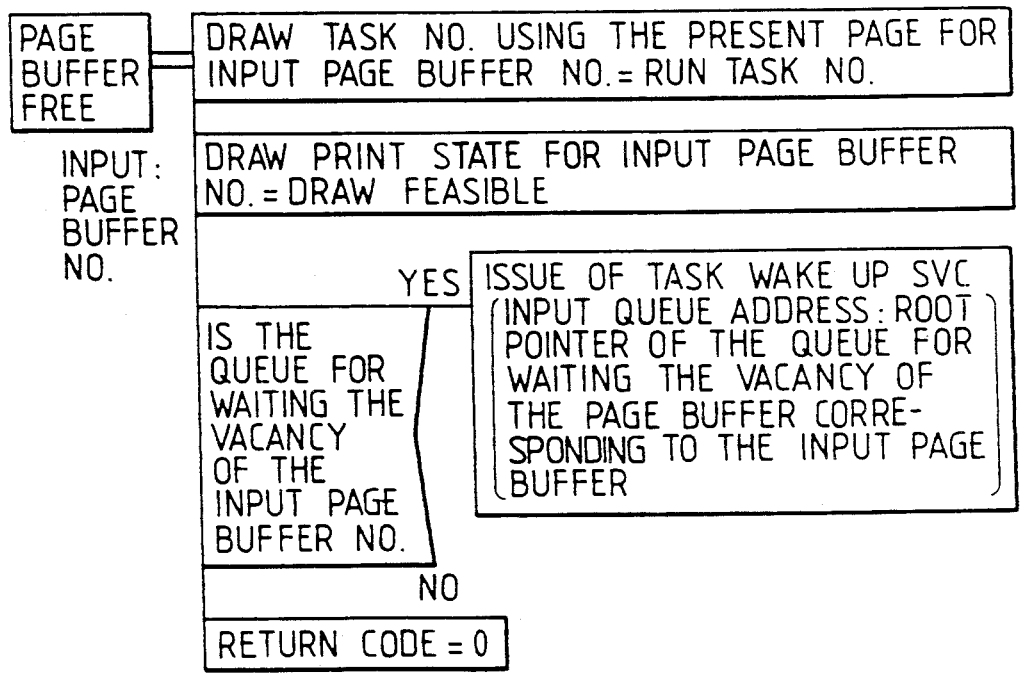

Referring to the task control table unit 17, the task control unit 12 performs the task controlling SVC functions (task wait, task wake up, etc.) which have been described in the first and second preferred embodiment in response to an initialization demand (issue) of the various portions of the printer controller according to the invention. The initialization demand are issued by the draw task processing unit 131 in the task processing unit 13, the printing task processing unit 132, and various device drivers 116, 117, 118 and 119 by employing the timer hardware 114. For instance, the timer control unit 115 monitors the end of the printing operation (implies the outputting end of the cut sheet type printing, paper) (see FIG. 12J). To monitor the end by the timer control unit, a specific SVC is prepared. This SVC is issued by the respective portions 131, 132, 116, 117, 118 and 119 within the printer controller according to the preferred embodiment so as to demand an initialization. The respective device drivers 116, 117, 118 and 119 have the following functions.

The page buffer control unit 116 controls the resources of the page buffer arranged by "N" pages, in other words the vacancy condition thereof by preparing a page buffer reserve and a page buffer free as represented in a first table, with reference to the page buffer control table unit 18. The page buffer control unit 116 performs a discrete interrupt process referred to as a "page readout end interrupt process" in accordance with an interrupt from a printer memory controller, as represented in a second table.

The task process unit 13 requests a control of the page buffer unit 143 to the page buffer control unit 116 in question by issuing the above-described page buffer controlling SVC.

The printer control unit 117 performs the resource control (vacancy condition control) of the printer engine unit 16 and also the input/output control of the printer engine unit 16 by preparing the printer reserve, printer free, SVC for printing instruction or the like as represented in a third table with reference to the printer control table unit 19. The printer control unit 117 performs the discrete interrupt process such as the printing instruction allow interrupt process, page readout start interrupt process, printing end interrupt process and the like as represented in a fourth table. The respective tasks 131, and 132 within the task processing unit 113 request the printer control unit 117 to input/output control and the resource supervision of the printer engine unit 16 by issuing the above-described printer controlling SVC.

The host communication control unit 118 is constructed of the discrete SVC process and discrete interrupt process so as to control the host communication controller 102.

The panel control unit 119 is arranged by the discrete SVC process and discrete interrupt process so as to control the user operation panel 107 via the sub-CPU 106.

The feature of the third preferred embodiment is to employ the page buffer control unit 116 and printer control unit 117. The effects of this preferred embodiment are as follows.

(1). Both the resource managing function of the page buffer unit 14 and printer engine unit 16, and also the input/output control function between the printer adapter unit and the printer engine unit can be effectively independent from the task process unit 13.

(2) In case that the different sorts of printer engine units 16 are connected by the above item (1), and the specifications such as a capacity of the page buffer unit 14, each page buffer size, a total amount "N" of the page buffer are changed, only the necessary portions in the page buffer control unit 116 and printer control unit 117 are varied without changing the contents of the task processing unit 13.

(3). According to the process of the task processing unit 13, CPU is operated at the task level (the minimum interrupt level "1") and system mode, where as according to the processes of the kernel unit 113 and various device drivers 116, 117, 118 and 119, CPU is operated at the interrupt level m (m>1) which is higher than the task level and user mode.

As a result, in accordance with the operations of the various control tables 17, 18 and 19, the task process unit 13 cannot be operated under the exclusive control mode, so that the reliability of the control program of the printer controller according to the preferred embodiment can be improved.

The process sequence according to the preferred embodiment is illustrated in FIG. 12. It should be understood that FIGS. 12A to 12J correspond to FIGS. 5A to 5J. The different points are as follows. As represented in the first table and the third table, both the drawing task and printing task request the page buffer control and printer control to the page buffer controlling SVC and printer controlling SVC, and each of these SVC can perform the requested process.

In FIGS. 13A to 13D, there are shown the process sequence of the typical four functions to execute the resources managements among these SVC.

In accordance with the preferred embodiment, even if the following changes are made therein, the printer controller having the similar effects can be realized.

(i) As the task condition, although the rest condition instead of the non-registered condition has been resistered, the not yet initialized condition is employed and TCB is brought into the system non-register condition.

As a result, instead of the task generation SVC, the task initialization SVC (the task is moved from the rest condition to the execute condition) is employed, and the task end SVC enables the task to be brought into the rest condition from the execution condition.

(ii) Both the task wait and task wake up functions are changed into the following items.

1). The waiting queue pointer within TCB is independently provided for the ready waiting queue and event waiting queue.

2). In the process of the task waiting SVC, the ready waiting queue pointer within TCB is not removed from the ready waiting queue, but the event waiting queue pointer within TCB is connected to a proper position (similar to the conventional task waiting condition) of the corresponding event waiting queue.

3). The task priority is not changed into the task waiting SVC and task wake up SVC.

It should be noted that the task priority of the printing task is set to be higher than the task priority of the drawing task under the initial condition By way of the change of the above-described item (ii), the sequence of the task as to the respective task priority in the ready waiting queue is not reversed.

While has been described in detail, since the printer engine unit and page buffer unit of the printer controller according to the present invention can be operated without any idle time, the throughput can be improved and the printing operation can be carried out at the maximum speed of the printer engine.

What is claimed is:

1. A method for printing an image data in a printing system including a printer engine unit, a buffer unit having a plurality of page buffers for storing the image data to be printed, a printer adapter means for outputting the image data stored in the buffer unit to the print engine unit, and a central processing unit for controlling to print the image data in response to a drawing command and a printing command, the method comprising the steps of:

creating a drawing task in response to the drawing command;

acquiring an empty one of page buffers by said drawing task;

starting to draw the image data corresponding to said drawing task into said acquired page buffer; and initializing a printing task corresponding to the printing command by said drawing task after said drawing task executes the drawing of the image data of one page in said one of page buffers.

2. A printing method according to claim 1, wherein:

said printing task has higher priority than said drawing task, said printing task initialized by said drawing task being executed under said priority.

3. A printing method according to claim 1, the method further comprising the steps of:

generating a printing instruction to the printer adapter means by said printing task.

4. A printing method according to claim 3, the method further comprising the steps of:

issuing a print starting command to the printer engine unit by the printer adapter means in response to said printing instruction and transferring said printing task which generates said printing instruction into a printing instruction allow waiting conditions.

5. A printing method according to claim 4, the method further comprising the steps of:

reading out the image data corresponding to said printing task stored in said one of page buffers by the printer adapter means to the printer engine unit after issuing said print starting command by the printer adapter means.

6. A printing method according to claim 5, the method further comprising the steps of:

monitoring the end of reading out the image data from said one of page buffers by the adapter means; and issuing a page readout end interruption to the CPU at a time of detecting the end of reading out by the adapter means.

7. A printing method according to claim 6, the method further comprising the steps of:
releasing said page buffer by the CPU in response to said page readout end interruption; and
releasing another drawing task in a page buffer empty waiting conditions, if said another drawing task exists in said page buffer empty waiting condition.

8. A printing method according to claim 7, the method further comprising the steps of:
monitoring the state of the printer engine unit by the printer adapter means; and
issuing a printing instruction allow interruption to the CPU when the printer adapter means detects that the printer engine unit becomes feasible to receive another print starting command.

9. A printing method according to claim 8, the method further comprising the steps of:
releasing said printing task from said printing instruction allow waiting condition in response to said printing instruction allow interruption by the printer adapter means.

10. A print method according to claim 9, the method further comprising the steps of:
issuing another printing instruction by said print task which is released from said printing instruction allow waiting condition, when there is another page to be printed by said print task.

11. A printing method according to claim 10, the method further comprising the steps of:
transferring said printing task into a sheet outputting end waiting condition, when a total number of page to be printed is printed by said print task.

12. A printing method according to claim 11, the method further comprising the steps of:
issuing a sheet outputting end interruption by the printer adapter means to the CPU, when the printer adapter means detects a sheet outputting end; and
releasing said printing task from said sheet outputting end waiting condition.

13. A printing method according to claim 12, the method further comprising the steps of:
renewing a page number of said sheet outputting end.

14. A printing method according to claim 13, the method further comprising the steps of:
ending the process of said printing task which is released from said sheet outputting end waiting condition.

15. A method for printing an image data in a printing system including a printer engine unit, a buffer unit having a plurality of page buffers for storing the image data to be printed, a printer adapter means for outputting the image data stored in the buffer unit to the print engine unit, and a CPU for controlling to print the image data in response to a drawing command and a printing command, the method comprising the steps of:
creating a drawing task in response to the drawing command starting to draw the image data of one page corresponding to said drawing task into one of said page buffers in response to a page read out interruption from the adapter means;
initializing a printing task corresponding to the printing command by said drawing task after said drawing task executes the drawing of the image data in said one of said page buffers;
issuing a print starting command to the printer engine unit by the printer adapter means in response to said printing instruction transferring said printing task which generates said printing instruction into a printing instruction allow waiting condition; and
releasing said printing task from a printing instruction allow waiting condition in response to a printing instruction allow interruption by the printer adapter means, when the printer adapter means detects that the printer engine unit becomes feasible to receive another print starting command.

16. A printer controlling apparatus for controlling an image data transfer to a printer engine unit to print an image corresponding to the image data, comprising:
a command buffer unit for storing a plurality of drawing commands for instructing drawing operation and printing commands for instructing printing operation;
a page buffer unit for storing the image data drawn by said drawing commands, said page buffer unit including a plurality of page buffers;
a printer adapter means for outputting the image data stored in said page buffer unit to the printer engine unit; and
a central processing unit including controlling means for controlling to process said drawing operation and said printing operation as a drawing task and a printing task, page buffer control means for controlling a use state of each of said page buffers, and printer control means for controlling a use state of the printer engine unit and an input/output control of the printer engine unit.

17. A printer controlling apparatus according to claim 16, wherein:
said command buffer unit receives said commands under an asynchronism condition.

18. A printer controlling apparatus according to claim 16, wherein:
said drawing task includes a means for initializing said printing task corresponding to one of said page buffers after drawing the image data of one page in said one of said page buffers, and a means for drawing of the image data of a next page after acquiring another of said page buffers for the image data of said next page; and
said page buffer control means includes an acquiring means for acquiring an empty one of said page buffers, and a setting means for setting said drawing task to a wait state for waiting an empty one of said page buffers, when none of said page buffers can be acquired by said acquiring means.

19. A printer controlling apparatus according to claim 18, wherein:
said printing task includes a means for issuing a printing instruction to said printer control means for instructing said printer control means to print the image data drawn in said one of said page buffers.

20. A printer controlling apparatus according to claim 19, wherein:
said printer control means includes a means for ordering said printer adapter means to issue a print starting command to the printer engine unit, and a means for transferring said printing task to a printing instruction allow waiting condition.

21. A printer controlling apparatus according to claim 20, wherein:
said printer adapter means includes a means for issuing said print starting command to the printer engine unit, and a means for outputting the image data drawn in said one of said page buffers to the printer engine unit after the issue of said print starting command by said issuing means.

22. A printer controlling apparatus according to claim 21, wherein:
said printer adapter means further includes a means for monitoring the state of the printer engine unit, and a means for issuing a printing instruction allow interruption to said CPU at a time of detecting a printing instruction allow condition of the printer engine unit.

23. A printer controlling apparatus according to claim 22, wherein:
said printer instruction allow interruption issuing means includes a means for detecting said printing instruction allow condition of the print engine unit with a timer for counting a predetermined time after issuing said print starting command.

24. A printer controlling apparatus according to claim 22, wherein:
said printer instruction allow interruption issuing means includes a means for detecting said printing instruction allow condition of the print engine unit with receiving a printing instruction allow signal provided from the printer engine unit.

25. A printer controlling apparatus according to claim 22, wherein:
said printer adapter means further includes means for sending a page buffer reading end interruption to said CPU after reading out the image data from said one of said page buffers in response to said printing instruction issued by said printing task.

26. A printing controlling apparatus according to claim 25, wherein:
said page buffer control means includes a means for setting said page buffer, the image data of which is read out, into an empty state in response to said page buffer reading end interruption, and a means for releasing another drawing task from a page buffer empty waiting condition, when there exists said another drawing task which is in said buffer empty waiting condition.

27. A printer controlling apparatus according to claim 26, wherein:
said controlling means includes a means for releasing said printing task in said printer instruction allow waiting condition in response to said printer instruction allow interruption.

28. A printer controlling apparatus according to claim 27, wherein:
said printing task which is released from said printing instruction allow waiting condition reissues another printing instruction, when there is another page to be printed by said print task.

29. A printer controlling apparatus according to claim 27, wherein:
said printing task which is released from said printing instruction allow waiting condition is transferred to a sheet outputting end waiting condition.

30. A printer controlling apparatus according to claim 29, wherein:
said printer adapter means includes a means for issuing a sheet outputting end interruption to said CPU, when said printer adapter means detects a sheet outputting end.

31. A printer controlling apparatus according to claim 30, wherein:
said controlling means releases said printing task from said sheet outputting end waiting condition in response to said sheet outputting end interruption.

32. A printer controlling apparatus according to claim 31, wherein:
said controlling means updates a page number of said sheet outputting end.

33. A printer controlling apparatus according to claim 32, wherein:
said printing task which is released from said sheet outputting end waiting condition finishes the process thereof.

34. A printer controlling apparatus for controlling an image data transfer to a printer engine unit to print an image corresponding to the image data, comprising:
a command buffer unit for storing a plurality of drawing commands for instructing drawing operation and printing commands for instructing printing operation;
a page buffer unit for storing the image data drawn by said drawing commands, said page buffer unit including a plurality of page buffers;
a printer adapter means for outputting the image data stored in said page buffer unit to the printer engine unit; and
a central processing unit including controlling means for controlling to process said drawing operation and said printing operation as a drawing task and a printing task, page buffer control means for controlling a use state of each of said page buffers, said page buffer and printer control means for controlling a use state of the printer engine unit and an input/output control of the printer engine unit;
wherein said printer adapter means includes means for issuing a page buffer reading end interruption to said CPU after reading out the image data from one of said page buffer, and a printing instruction allow interruption to said CPU after detecting a printing instruction allow condition of the printer engine unit.

* * * * *